United States Patent
Fukai et al.

(10) Patent No.: US 7,251,390 B2
(45) Date of Patent: Jul. 31, 2007

(54) PLANAR WAVEGUIDE DEVICE

(75) Inventors: Yasuo Fukai, Habikino (JP); Toshiyuki Okumura, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 11/497,691

(22) Filed: Aug. 1, 2006

(65) Prior Publication Data
US 2007/0025658 A1    Feb. 1, 2007

(30) Foreign Application Priority Data
Aug. 1, 2005 (JP) ............................. 2005-222993

(51) Int. Cl.
*G02B 6/12* (2006.01)
(52) U.S. Cl. ........................................ 385/14; 385/129
(58) Field of Classification Search ................ 385/14, 385/129–132, 147
See application file for complete search history.

(56) References Cited

U.S. PATENT DOCUMENTS

| | | | | |
|---|---|---|---|---|
| 6,366,730 | B1* | 4/2002 | Cappuzzo et al. | 385/129 |
| 6,724,969 | B2* | 4/2004 | Gao et al. | 385/131 |
| 2004/0184730 | A1* | 9/2004 | Nikonov et al. | 385/37 |

OTHER PUBLICATIONS

Morandotti, R. et al. (Dec. 6, 1999). "Experimental Observation of Linear and Nonlinear Optical Bloch Oscillations," *Physical Review Letters* 83(23):4756-4759.
Pertsch, T. et al. (Dec. 6, 1999). "Optical Bloch Oscillations in Temperature Tuned Waveguide Arrays," *Physical Review Letters* 83(23):4752-4755.
Peschel, U. et al. (Nov. 1, 1998). "Optical Bloch Oscillations in Waveguide Arrays," *Optics Letters* 23(21):1701-1703.
Sakai, A. et al. (Apr. 15, 2001). "Propagation Characteristics of Ultrahigh-Δ Optical Waveguide on Silicon-on-Insulator Substrate," *Jpn. J. Appl. Phys.* 40:L383-L385, part 2, No. 4B.

* cited by examiner

*Primary Examiner*—Quyen P Leung
(74) *Attorney, Agent, or Firm*—Morrison & Foerster LLP

(57) ABSTRACT

An OBO planar waveguide device includes an Si substrate, an $SiO_2$ layer formed on the Si substrate, and a plurality of Si optical waveguides provided on the Si substrate in parallel to each other. A heater and a heat sink are provided on opposing side end portions of the Si substrate respectively. As a result of a function of the heater and the heat sink, gradient of temperature distribution of the Si substrate is formed in a direction in which the plurality of Si optical waveguides are aligned. Thermal resistance of the Si substrate in the direction in which the gradient of temperature distribution is formed is greater than 20 K/W and lower than 2000 K/W. The OBO planar waveguide device attaining reduced power consumption is thus obtained.

10 Claims, 16 Drawing Sheets

PLANAR WAVEGUIDE DEVICE

This nonprovisional application is based on and claims priority to Japanese Patent Application No. 2005-222993 filed with the Japan Patent Office on Aug. 1, 2005, the entire contents of which are hereby incorporated by reference.

FIELD OF THE INVENTION

The present invention relates to a planar waveguide device demultiplexing a multiplexed signal wave utilizing optical bloch oscillations (hereinafter, referred to as "OBO"), and outputting each demultiplexed signal wave from a desired port.

DESCRIPTION OF THE BACKGROUND ART

In wavelength division multiplexing (hereinafter, referred to as "WDM") optical communication, as a multiplexed wave including a signal wave of a wavelength of 1.5 µm and a signal wave of a wavelength of 1.3 µm is transmitted through one optical fiber, large-capacity and high-speed optical communication is realized. Meanwhile, in WDM optical communication, a device for demultiplexing the multiplexed wave so that an individual signal wave is output from a designated port is necessary. For example, Non-Patent Documents 1 to 4 described below propose as a demultiplexing device, a planar waveguide device utilizing optical bloch oscillations (hereinafter, referred to as "OBO planar waveguide device").

Non-Patent Document 1: R. Morandotti, U. Peschel, and J. S. Aitchison, "Experimental Observation of Linear Nonlinear Optical Bloch Oscillations," Physical Review Letters, Vol. 83, No. 23, pp. 4756-4759 (Dec. 6, 1999).

Non-Patent Document 2: T. Pertsch, P. Dannberg, W. Elflein, and A Brauer, "Optical Bloch Oscillations in Temperature Tuned Waveguide-Arrays," Physical Review Letters, Vol. 83, No. 23, pp. 4752-4755 (Dec. 6, 1999).

Non-Patent Document 3: U. Peschel, T. Pertsch, and F. Lederer, "Optical Bloch oscillations in waveguide arrays," Optics Letters, Vol. 23, No. 21, pp. 1701-1703 (Nov. 1, 1998).

Non-Patent Document 4: A. Sakaki, G. Hara and T. Baba, "Propagation Characteristics of Ultrahigh-Δ Optical Waveguide on Silicon-on-Insulator Substrate," Japanese Journal Applied Physics., Vol. 40, No. 4B, pp. L383-L385 (Apr. 15, 2001).

FIG. 48 shows an OBO planar waveguide device disclosed in Non-Patent Document 2. As shown in FIG. 48, a conventional OBO planar waveguide device 300 includes a substrate 301 composed of $SiO_2$ (silicon dioxide) and glass, a macromolecular clad layer 302 preventing a propagating signal wave from leaking from an optical waveguide, a plurality of optical waveguides 303 for propagation of light formed from a macromolecular material, an input port 304 for a signal wave and an output port 305 for a signal wave in the plurality of optical waveguides 303, and a heater 306 and a heat sink 307 for controlling gradient of temperature distribution of substrate 301.

In addition, FIG. 48 also shows a path 308 of the signal wave that propagates through the plurality of optical waveguides 303 while OBO is being caused. As shown in FIG. 48, a direction in which the plurality of optical waveguides 303 are aligned is assumed as an X-axis direction, a direction in which each optical waveguide 303 extends is assumed as a Y-axis direction, and a direction perpendicular to the X-axis direction and the Y-axis direction is assumed as a Z-axis direction. It is noted that a thickness and a size of substrate 301 are not specified in Non-Patent Document 2.

A method of manufacturing OBO planar waveguide device 300 will now be described. Initially, a macromolecular material for forming optical waveguide 303 is deposited on substrate 301. A resist film is applied onto the macromolecular material. Thereafter, a pattern of optical waveguide 303 is formed on the aforementioned resist film using electron beam lithography or photolithography. Using the resist film having the pattern formed as a mask, the aforementioned macromolecular material is etched so as to obtain optical waveguides 303 of OBO planar waveguide device 300. Thereafter, macromolecular clad layer 302 is deposited to cover substrate 301 and optical waveguides 303. Then, heater 306 is attached to one side end portion in the X-axis direction of substrate 301, and heat sink 307 is attached to the other side end portion in the X-axis direction of substrate 301.

According to OBO planar waveguide device 300 described above, temperature difference per unit length in the X-axis direction of substrate 301 is controlled by regulating the temperature of heater 306. In addition, difference in a refractive index per unit length in the X-axis direction of optical waveguide 303 is varied depending on the temperature difference. OBO originates from the difference in the refractive index. Generally, in OBO planar waveguide device 300 having optical waveguide 303 formed from the macromolecular material, optical waveguide 303 at a position where substrate 301 attains to a high temperature has a refractive index lower than that of optical waveguide 303 at a position where substrate 301 attains to a low temperature.

While aforementioned OBO planar waveguide device 300 is used, gradient of temperature distribution in the X-axis direction of substrate 301 is generated due to a function of heater 306 and heat sink 307. Then, a plurality of signal waves different in wavelength are input to OBO planar waveguide device 300 such that a peak of signal wave intensity is located at one prescribed input port 304. Accordingly, each of the plurality of signal waves leaks from optical waveguide 303 through which it passes, and is coupled to adjacent optical waveguide 303. Consequently, OBO of the plurality of signal waves occurs in the X-axis direction while the signal waves propagate in the Y-axis direction. Generally, as the wavelength of the signal wave is higher, the amplitude of OBO is greater. In addition, amplitude of OBO tends to be smaller as the difference in the refractive index per unit length in the X-axis direction of optical waveguide 303, that is, gradient of distribution of the refractive index in the X-axis direction of optical waveguide 303, is greater. In other words, the amplitude of OBO is different for each wavelength of the signal wave, depending on a characteristic of OBO.

Meanwhile, the multiplexed wave is obtained by superimposing a plurality of signal waves different in wavelength onto each other. Accordingly, path 308 of propagation through OBO planar waveguide device 300, of the multiplexed wave input to OBO planar waveguide device 300 is different for each wavelength. That is, the multiplexed wave is demultiplexed in OBO planar waveguide device 300. In addition, each demultiplexed signal wave is output from specific output port 305 as a single wave.

By regulating the temperature difference per unit length in the X-axis direction of substrate 301 using heater 306 and heat sink 307, the difference in the refractive index per unit length in the X-axis direction of optical waveguide 303 is controlled. By controlling the difference in the refractive index, magnitude of the amplitude of OBO of the demultiplexed signal wave can be regulated, to freely designate output port 305 for individual signal wave. Therefore, OBO planar waveguide device 300 can be utilized as a variable demultiplexer.

If OBO planar waveguide device 300 is employed as a demultiplexing device in WDM optical communication and if the signal wave in a band of 1.55 μm wavelength and the signal wave in a band of 1.3 μm wavelength propagate through optical waveguide 303 formed from the macromolecular material, however, propagation loss of the signal wave is significant. Therefore, OBO planar waveguide device 300 having optical waveguide 303 formed from a macromolecular material is not suitable as the demultiplexing device in WDM.

Meanwhile, in Non-Patent Document 4, an SOI (Silicon On Insulator) substrate is used as a method of reducing propagation loss of the signal wave in a band of 1.55 μm wavelength, and silicon is used as a material for the optical waveguide. In the SOI substrate, a silicon oxide ($SiO_2$) layer and an Si layer are stacked successively on a silicon (Si) substrate. The Si layer having a thickness of approximately 0.3 μm and serving as an uppermost layer is etched to form the optical waveguide composed of Si (hereinafter, referred to as the "Si optical waveguide"). According to this OBO planar waveguide device, even when the signal wave in a band of 1.55 μm wavelength propagates through the Si optical waveguide, propagation loss of the signal wave is considerably small.

If the OBO planar waveguide device having the Si optical waveguide formed with the use of the SOI substrate is employed in order to reduce propagation loss in the OBO planar waveguide device as described in Non-Patent Document 4 above, power consumption of the heater for controlling the temperature difference (gradient of temperature distribution) per unit length in the X-axis direction of the Si substrate becomes greater.

Namely, in the aforementioned OBO planar waveguide device, thermal resistance of the Si substrate is lower than that of substrate 301 in conventional OBO planar waveguide device 300. Accordingly, if the heater is used consuming power as much as in the conventional example, the temperature difference per unit length in the X-axis direction of the Si substrate is made smaller. Therefore, in order to achieve the temperature difference per unit length in the X-axis direction of the Si substrate equal to that in the conventional example, power consumption greater than in conventional OBO planar waveguide device 300 is necessary.

SUMMARY OF THE INVENTION

The present invention was made in view of the above-described problems. An object of the present invention is to provide an OBO planar waveguide device attaining reduced power consumption of a heater necessary for demultiplexing a multiplexed signal wave.

When the temperature difference per unit length in the X-axis direction of the Si substrate is set to a value the same as in the conventional example by setting the temperature of the heater higher than in the conventional example, a time period until each output port for the demultiplexed signal wave is changed becomes longer. That is, response of the OBO planar waveguide device is deteriorated.

In addition, in the conventional planar waveguide device, one heater 306 is provided on one side end surface of substrate 301, and heat sink 307 is provided on the other side end surface of the substrate. Accordingly, regardless of whether the SOI substrate is used for manufacturing the substrate, heat conduction from heater 306 to heat sink 307 takes considerably long time, and control of temperature distribution of substrate 301 for each part thereof is impossible. Therefore, in the conventional OBO planar waveguide device, it takes longer time to change the output port for the signal wave, and fine control of the temperature distribution of the substrate is impossible.

Another object of the present invention is to provide an OBO planar waveguide device attaining improved response and controllability by achieving shorter time necessary for demultiplexing a multiplexed wave as well as fine control of temperature distribution of a substrate.

An OBO planar waveguide device according to one aspect of the present invention includes: an Si substrate; an insulating layer provided on the Si substrate; a plurality of Si optical waveguides aligned substantially in parallel to each other on one main surface of the insulating layer; and a heater for controlling gradient of temperature distribution of the Si substrate in a direction in which the plurality of Si optical waveguides are aligned. The heater is provided on one side end surface of the Si substrate in the direction in which the plurality of Si optical waveguides are aligned, and heat generated by the heater conducts from one side end surface of the Si substrate toward the other side end surface opposed to one side end surface. The Si substrate has thermal resistance greater than 20 K/W and lower than 2000 K/W, between one side end surface and the other side end surface.

According to the configuration described above, as the Si substrate having thermal resistance greater than 20 K/W which represents the thermal resistance of the conventional Si substrate is used, the gradient of temperature distribution of the Si substrate tends to be great. Therefore, power consumption of the heater can be lowered, as compared with the conventional planar waveguide device.

In order to increase the thermal resistance, it is also possible to make smaller a product of a thickness of the Si substrate and a length of the Si substrate in a direction in which the plurality of Si optical waveguides extend. If the aforementioned product is made too small, however, the Si substrate has an extremely small size, and the Si substrate does not have sufficient mechanical strength and is prone to damage. On the other hand, according to the configuration above, as the upper limit of the thermal resistance of the Si substrate is smaller than 2000 K/W, the planar waveguide device employing the Si substrate having a size less prone to damage is obtained.

Moreover, control the same as in the conventional planar waveguide device is possible with power consumption lower than in the conventional example. Therefore, if the planar waveguide device according to the present invention is controlled with power consumption as high as in the conventional planar waveguide device, response thereof can be improved.

Desirably, a product of a thickness of the Si substrate and a length of the Si substrate in a direction in which the plurality of Si optical waveguides extend is greater than 500 $\mu m^2$ and smaller than 50000 $\mu m^2$. According to the configuration, as the aforementioned product is greater than 500 $\mu m^2$ (corresponding to 2000 K/W), sufficient mechanical strength of the Si substrate is ensured. In addition, as the aforementioned product is smaller than 50000 $\mu m^2$ (corresponding to 20 K/W), the thermal resistance of the Si substrate is greater than 20 K/W.

Desirably, the Si substrate has an impurity concentration higher than $1\times10^{20}$ cm$^{-3}$ and lower than $1\times10^{22}$ cm$^{-3}$, and a product of a thickness of the Si substrate and a length of the Si substrate in a direction in which the plurality of Si optical waveguides extend is greater than 500 μm$^2$ and smaller than 100000 m$^2$. If the Si substrate is doped with the impurity in this manner, the upper limit of the product of the thickness of the Si substrate and the length of the Si substrate in the direction in which the plurality of Si optical waveguides extend can be made larger. If the impurity concentration is not higher than $1\times10^{20}$ cm$^{-3}$, however, an effect from doping of the Si substrate with the impurity may hardly be obtained. Meanwhile, if the impurity concentration is not lower than $1\times10^{22}$ cm$^{-3}$, defect originating from significant change in a characteristic of the Si substrate may occur. Therefore, the impurity concentration in the aforementioned range is desirably set.

Desirably, the plurality of Si optical waveguides are composed of Si without being doped with an impurity. According to the configuration, as compared with the planar waveguide device in which the plurality of optical waveguides are doped with the impurity, a difference between carrier density of the Si optical waveguide at a high temperature and carrier density of the Si optical waveguide at a low temperature becomes greater. Here, as the difference in the carrier density is greater, the difference in the refractive index is greater. Accordingly, even if heat capacity provided by the heater to the Si substrate is the same, the difference between the refractive index of the Si optical waveguide at a high temperature and the refractive index of the Si optical waveguide at a low temperature becomes greater. Therefore, power consumption of the OBO planar waveguide device is lowered.

An OBO planar waveguide device according to another aspect of the present invention includes: a substrate; a plurality of optical waveguides aligned substantially in parallel to each other on one main surface of the substrate; and a heater for controlling gradient of temperature distribution of the substrate in a direction in which the plurality of optical waveguides are aligned. The heater has a plurality of heat generating portions provided on the other main surface of the substrate.

According to the configuration described above, the plurality of heat generating portions can be used to control the gradient of temperature distribution of the substrate. Accordingly, as compared with the planar waveguide device in which the gradient of temperature distribution of the substrate is controlled by using a single heat generating portion, the gradient of temperature distribution can be made greater more rapidly. Namely, response of the planar waveguide device is improved. In addition, as temperature change in each part of the substrate can individually be controlled, response and controllability of the planar waveguide device is improved. Further, improvement in response and controllability leads to reduction in power consumption of the heater.

The plurality of heat generating portions described previously may extend substantially in parallel to each other from one end to the other end on the other main surface of the substrate, such that a direction in which the plurality of heat generating portions are aligned is substantially identical to the direction in which the plurality of optical waveguides are aligned. With regard to relation between combinations of two adjacent heat generating portions among the plurality of heat generating portions, number density per unit length of the two heat generating portions may correspond to the gradient of temperature distribution.

The plurality of heat generating portions described previously may extend substantially in parallel to each other from one end to the other end on the other main surface of the substrate, such that a direction in which the plurality of heat generating portions are aligned is substantially identical to the direction in which the plurality of optical waveguides are aligned. With regard to relation between combinations of two adjacent heat generating portions among the plurality of heat generating portions, a ratio of difference in a voltage applied to the two heat generating portions to a pitch between the two heat generating portions may correspond to the gradient of temperature distribution. It is noted that, in the present aspect of the invention, the pitch between the two heat generating portions refers to a distance between reference lines.

The plurality of heat generating portions described previously may extend along a direction substantially perpendicular to a direction in which the plurality of heat generating portions are aligned, and degree of variation of the total of two-dimensionally viewed widths of the plurality of heat generating portions may correspond to the gradient of temperature distribution.

The plurality of heat generating portions described previously may extend substantially in parallel to each other from one end to the other end on the other main surface of the substrate, such that a direction in which the plurality of heat generating portions are aligned is substantially identical to the direction in which the plurality of optical waveguides are aligned. With regard to relation between combinations of two adjacent heat generating portions among the plurality of heat generating portions, a ratio of difference in a two-dimensionally viewed area of the two heat generating portions to a pitch between the two heat generating portions may correspond to the gradient of temperature distribution.

An OBO planar waveguide device according to yet another aspect of the present invention includes: a substrate; a plurality of optical waveguides aligned substantially in parallel to each other on one of main surfaces of the substrate; a heater for controlling gradient of temperature distribution of the substrate in a direction in which the plurality of optical waveguides are aligned; and a reinforcing substrate provided on the other main surface of the substrate. The heater is provided on one side end surface of the substrate in the direction in which the plurality of optical waveguides are aligned. Heat generated by the heater conducts from one side end surface of the substrate toward the other side end surface opposed to one side end surface. In addition, the reinforcing substrate has thermal conductivity lower than that of the substrate.

According to the configuration described above, as compared with an example without the reinforcing substrate, mechanical strength of the OBO planar waveguide is improved, and an amount of heat dissipated from the substrate to the outside is lowered. Therefore, power consumption of the heater is lowered. In addition, even if the power consumption of the heater is as high as in the conventional example, response of the planar waveguide device can be improved, because desired temperature change in the substrate can be achieved more rapidly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
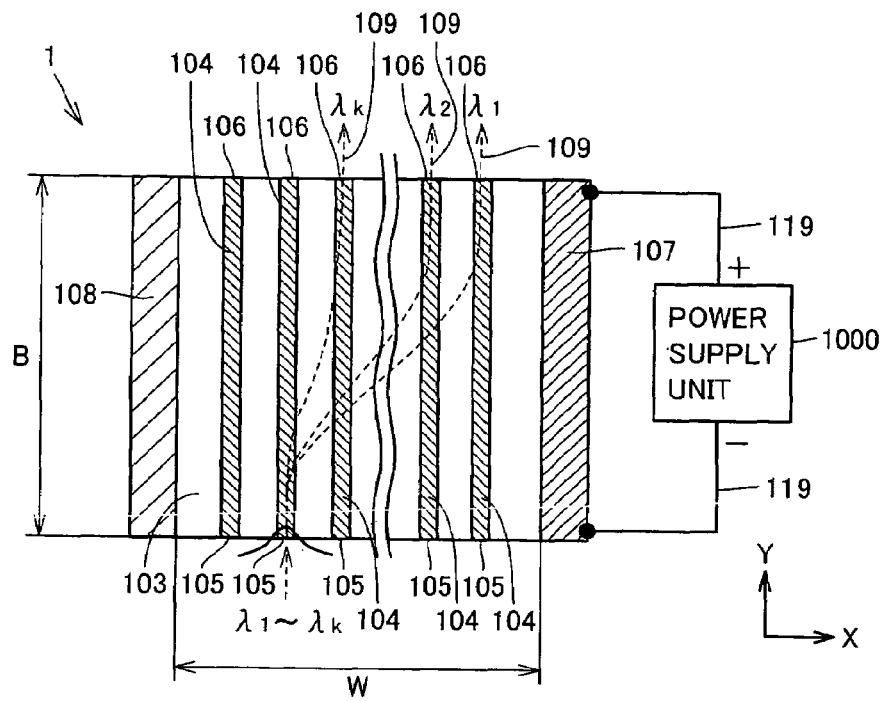
FIG. 1 is a top view of an OBO planar waveguide device 1 according to Embodiment 1 of the present invention.

An OBO planar waveguide device according to an embodiment of the present invention will be described hereinafter in detail with reference to the drawings. In each embodiment that appears subsequent to Embodiment 1, a portion corresponding to each portion of the. OBO planar waveguide device in Embodiment 1 is provided with the reference character of which last digit number is the same as in the OBO planar waveguide device in Embodiment 1. As the corresponding portions provided with the reference characters having the same last digit number are the same with each other in the structure and function, description thereof will not be repeated unless it is necessary.

Embodiment 1

Initially, a structure of an OBO planar waveguide device according to the present embodiment will be described with reference to FIGS. 1 to 8.

Figure 2:
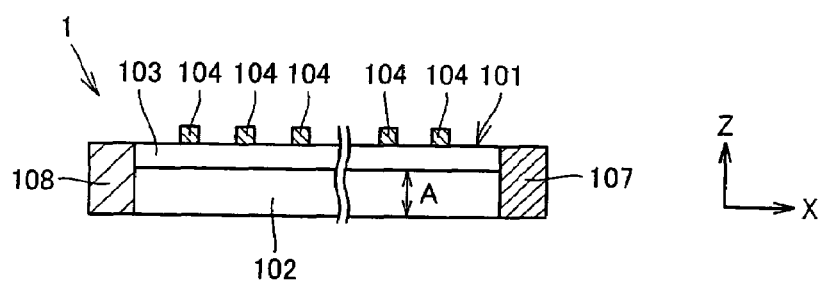
FIG. 2 is a side view of OBO planar waveguide device 1 according to Embodiment 1 of the present invention.

The OBO planar waveguide device according to the present embodiment is formed with the SOI substrate. As shown in FIGS. 1 and 2, an OBO planar waveguide device 1 includes a substrate 101. Substrate 101 has a back surface polished, and has an Si substrate 102 having a thickness of 100 μm and an $SiO_2$ layer 103 stacked on Si substrate 102 and having a thickness of approximately 1 μm. Si substrate 102 is doped with B (boron) at a concentration of $1\times10^{16}$ $cm^{-3}$.

A plurality of Si optical waveguides 104 are provided on $SiO_2$ layer 103. The plurality of Si optical waveguides 104 extend linearly, have the same shape and size, and are aligned along the X-axis in parallel to each other. Light representing the signal wave propagates through each of the plurality of Si optical waveguides 104. One end of Si optical waveguide 104 attains a function as an input port 105 for the signal wave, while the other end thereof attains a function as an output port 106 for the signal wave.

In addition, in order to control gradient of temperature distribution (temperature difference per unit length) generated in the X-axis direction of substrate 101, a heater 107 is provided on one side end surface of substrate 101, and a heat sink 108 is provided on the other side end surface of substrate 101.

In FIG. 1, a dotted arrow 109 indicates a path of the signal wave that propagates in the Y-axis direction through OBO planar waveguide device 1 while causing OBO in the X-axis direction. Here, as shown in FIG. 1, a direction in which the plurality of Si optical waveguides 104 are aligned is assumed as the X-axis direction, a direction in which each Si optical waveguide 104 extends is assumed as the Y-axis direction, and a direction perpendicular to the X-axis direction and the Y-axis direction is assumed as the Z-axis direction.

OBO planar waveguide device 1 according to the present embodiment is different from conventional OBO planar waveguide device 300 in that the back surface of substrate 101 is polished so as to make smaller the thickness of Si substrate 102.

OBO planar waveguide device 1 according to the present embodiment can control the temperature difference per unit length in the X-axis direction of substrate 101, that is, the gradient of temperature distribution in the X-axis direction of substrate 101, by regulating the temperature of aforementioned heater 107, as in conventional OBO planar waveguide device 300. Therefore, OBO planar waveguide device 1 can control the difference in the refractive index per unit length in the X-axis direction of Si optical waveguide 104, that is, the gradient of distribution of the refractive index in the X-axis direction of Si optical waveguide 104.

A method of manufacturing OBO planar waveguide device 1 including substrate 101 having the back surface polished described previously will now be described with reference to FIGS. 3 to 7.

Figure 3:
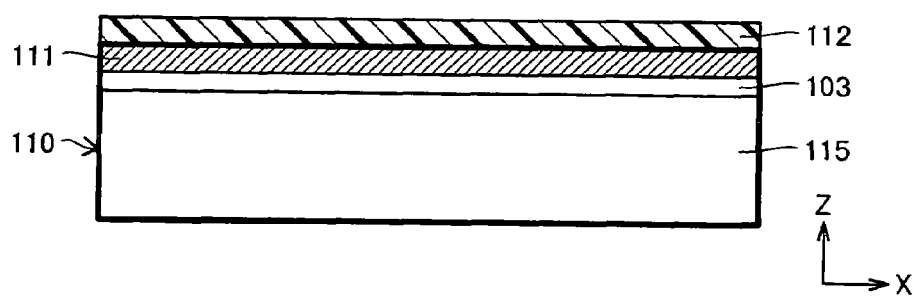
FIGS. 3 to 7 are diagrams illustrating steps of manufacturing OBO planar waveguide device 1 according to Embodiment 1 of the present invention.

Initially, an SOI substrate 110 implemented by stacking an Si substrate 115, $SiO_2$ layer 103 and an Si layer 111 having a thickness of 0.3 μm in this order is prepared. Thereafter, as shown in FIG. 3, a resist film 112 for electron beam having a thickness of 0.3 μm is applied onto Si layer 111.

Figure 4:
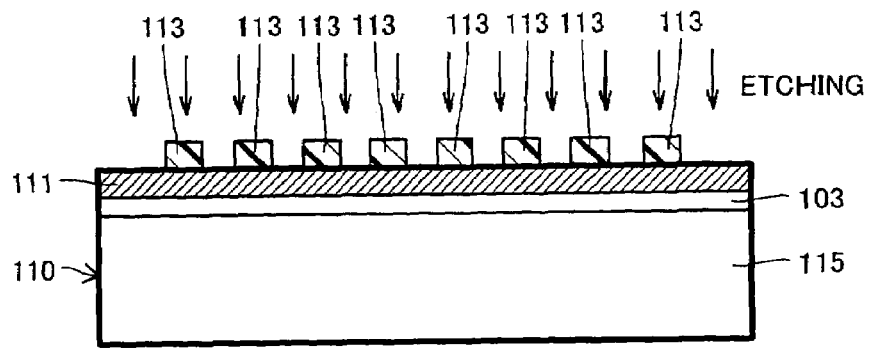

Thereafter, electron beam direct writing is used to process resist film 112, to form a resist pattern 113 as shown in FIG. 4. In the present embodiment, electron beam direct writing is performed under a condition that beam current of the electron beam is set to 0.1 nA and an electron beam dose time period per 1 dot is set to 4.5 μsec. Alternatively, resist pattern 113 is obtained also by photolithography, in a transfer time period of approximately 10 sec. It is noted that Si layer 111 in the present embodiment is a non-doped layer.

Figure 5:
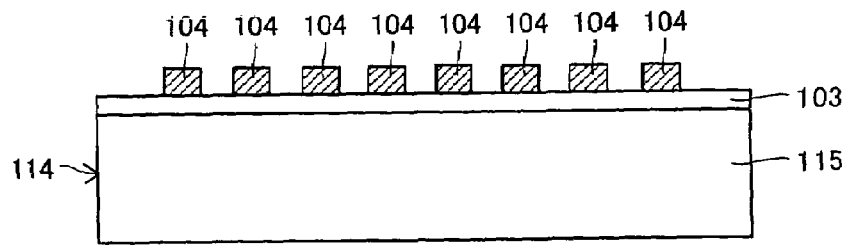

Using aforementioned resist pattern 113 as a mask, an etching method such as ICP (Inductively Coupled Plasma) etching, reactive ion etching or reactive ion beam etching is used to etch Si layer 111 as shown in FIG. 4, thereby obtaining Si optical waveguide 104 shown in FIG. 5. In the present embodiment, reactive ion etching performed under the condition that a mixed gas of chlorine gas of 25 sccm and nitrogen gas of 10 sccm is used as the etching gas, etching pressure is set to 1 Pa, and RF (Radio Frequency) power is set to 200 W is employed.

Figure 6:
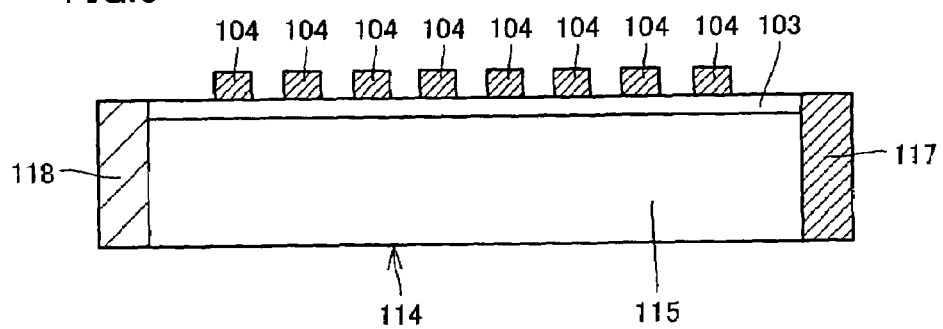

Thereafter, as shown in FIG. 6, sputtering or vapor deposition is used to form a tantalum nitride film 117 serving as heater 107 in one side end portion in the X-axis direction of a substrate 114. In addition, sputtering or vapor deposition is used to form an aluminum nitride film 118 serving as heat sink 108 in the other side end portion in the X-axis direction of substrate 114.

Figure 7:
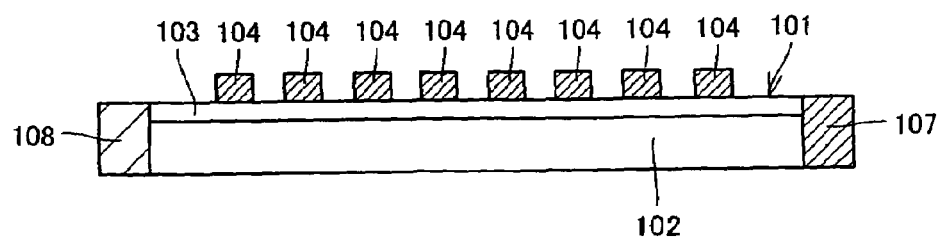

Then, as shown in FIG. 7, the back surface of Si substrate 115 in substrate 114 of OBO planar waveguide device 1 formed with SOI substrate 110 is polished. In the present embodiment, the back surface of Si substrate 115 is polished until substrate 114 that has had the thickness of 600 μm has the smaller thickness of approximately 100 μm. Substrate 101 consisting of Si substrate 102, $SiO_2$ layer 103, Si optical waveguide 104, heater 107 made of the tantalum nitride film, and heat sink 108 made of aluminum nitride film is thus formed. Here, opposing end surfaces in the direction in which the plurality of Si optical waveguides 104 extend serve as input port 105 and output port 106, respectively.

Finally, as shown in FIG. 1, in order to change the temperature of heater 107, one metal line 119 and another metal line I 19 are used to electrically connect a power supply unit 1000 to heater 107. One metal line 119 is connected to a positive terminal of power supply unit 1000 and one end of heater 107 in the Y-axis direction. Another metal line 119 is connected to a negative terminal of power supply unit 1000 and the other end of heater 107 in the Y-axis direction.

An operation of aforementioned OBO planar waveguide device 1 will now be described with reference to FIGS. 1 and 2.

Initially, in OBO planar waveguide device 1, gradient of temperature distribution in the X-axis direction of substrate 101 is generated as a result of the function of heater 107 and heat sink 108. Here, the temperature of substrate 101 becomes gradually higher toward heater 107 in the X-axis direction. In general, as the temperature is greater, a semiconductor material has higher refractive index. Therefore, the refractive index of Si optical waveguide 104 located on a high-temperature side of substrate 101 is higher than that of Si optical waveguide 104 located on a low-temperature side of substrate 101.

Then, a plurality of signal waves constituting the multiplexed wave are input to OBO planar waveguide device 1 such that a peak of signal wave intensity is located at prescribed one input port 105. Accordingly, each of the plurality of signal waves leaks from optical waveguide 104 through which it passes, and is coupled to adjacent optical waveguide 104. Consequently, OBO of the plurality of signal waves occurs in the X-axis direction while the signal waves propagate in the Y-axis direction. Here, as the wavelength of the signal wave is greater, the amplitude of OBO is greater. In addition, amplitude of OBO tends to be smaller as the difference in the refractive index per unit length in the X-axis direction of Si optical waveguide 104, that is, gradient of distribution of the refractive index in the X-axis direction of Si optical waveguide 104, is greater.

The amplitude of OBO is different for each wavelength of the signal wave, depending on the characteristic of OBO. Therefore, a path 109 of propagation of the plurality of signal waves through OBO planar waveguide device 1 is different for each wavelength. That is, the signal wave is demultiplexed in OBO planar waveguide device 1. In addition, each demultiplexed signal wave is output from prescribed output port 106 as a single wave.

By regulating the temperature difference per unit length in the X-axis direction of substrate 101 using heater 107 and heat sink 108, the difference in the refractive index per unit length in the X-axis direction of Si optical waveguide 104 is controlled. Therefore, magnitude of the amplitude of OBO of the demultiplexed signal wave is regulated using heater 107, to freely designate output port 106 for the signal wave.

How heater 107 and heat sink 108 control the temperature difference per unit length in the X-axis direction of substrate 101 will now be described in detail with reference to FIGS. 1 and 2.

Substrate 101 of OBO planar waveguide device 1 is constituted Of $SiO_2$ layer 103 having a thickness of 1 μm and Si substrate 102 having a thickness of 100 μm. That is, the thickness Of $SiO_2$ layer 103 is extremely smaller than the thickness of Si substrate 102. Accordingly, thermal conductivity of a substance on substrate 101 is substantially determined by thermal conductivity ρSi of Si composing Si substrate 102. Therefore, thermal resistance Rx in the X-axis direction of substrate 101 is calculated as in the following equation (1).

$$R_X = \frac{1}{\rho_{Si}} \times \frac{W}{A \times B} \qquad (1)$$

Here, A represents the thickness of Si substrate 102, B represents a length in the Y-axis direction of Si substrate 102, that is, a length of the planar waveguide device, and W represents a length in the X-axis direction of Si substrate 102, that is, a width of the planar waveguide device.

In addition, gradient of temperature distribution (temperature difference per unit length) dT/dX of substrate 101 in the X-axis direction is calculated as in the following equation (2).

$$\frac{dT}{dX} = \frac{R_X \times Q}{W} = \frac{1}{\rho_{Si}} \times \frac{1}{A \times B} \times Q \quad (2)$$

Here, Q represents an amount of heat generated by heater 107.

In Equation (2) above, dT/dX and Q have linear relation. Therefore, by regulating amount of heat Q generated by heater 107, temperature difference dT/dX per unit length in the X-axis direction of substrate 101 can be controlled.

If the value of A becomes smaller in Equation (2) above, variation in the value of dT/dX with respect to variation in the value of Q becomes greater. In other words, if the thickness of Si substrate 102 is made smaller, temperature difference dT/dX per unit length in the X-axis direction of substrate 101 is significantly varied, even though an amount of heat supplied to Si substrate 102 by heater 107 is the same. Therefore, smaller thickness of Si substrate 102 of OBO planar waveguide device 1 leads to reduction in power consumption in OBO planar waveguide device 1 when a plurality of signal waves different in wavelength are demultiplexed.

Figure 8:
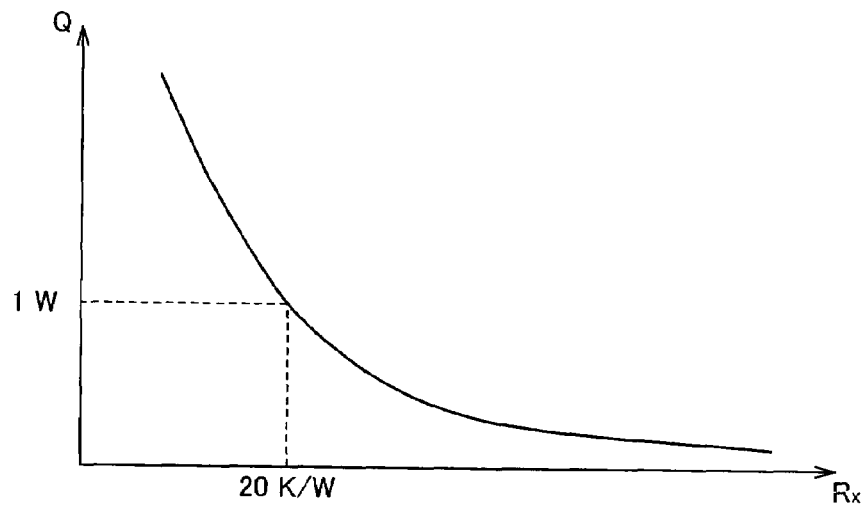
FIG. 8 is a graph showing relation between a value for thermal resistance of an Si substrate 102 of the OBO planar waveguide device according to Embodiment 1 of the present invention and an amount of heat Q generated by a heater 107 necessary for occurrence of OBO.

FIG. 8 shows relation between a value for thermal resistance of Si substrate 102 and amount of heat generation Q necessary for occurrence of OBO. As can be seen from FIG. 8, as the thermal resistance of Si substrate 102 is greater, amount of heat generation Q necessary for occurrence of the OBO is smaller. On the other hand, when Rx≧20 K/W, amount of heat generation Q is reduced to a value not higher than 1 W.

In the present embodiment, OBO planar waveguide device 1 is formed under the condition that A=100 μm, B=400 μm and W=100 μm. Meanwhile, in general, Si has thermal resistivity (1/ρSi) of 1 cm·(K/W). Therefore, in the present embodiment, Si substrate 102 has thermal resistance Rx of 25 K/W, and lower power consumption is achieved. As can be seen from Equation (1), in order for thermal resistance kx of Si substrate 102 to be greater than 20 K/W, a condition that A×B is smaller than 50000 μm² should be satisfied. Accordingly, if the thickness and the length in the Y-axis direction of Si substrate 102 are set so as to satisfy the condition above, OBO planar waveguide device 1 attaining lower power consumption can be formed. It is noted that thermal resistance Rx of Si substrate 102 is set to 4 K/W when the back surface of Si substrate 102 is not polished, and amount of heat generation Q of 6 W is necessary for causing OBO.

In order to increase the thermal resistance of Si substrate 102, it is merely necessary to make smaller the product of the thickness of the Si substrate and the length of the Si substrate in the direction in which the plurality of Si optical waveguides 104 extend. If the product described above is made too small, Si substrate 102 has an extremely small size. Namely, Si substrate 102 does not have sufficient mechanical strength and is prone to damage. Therefore, Si substrate 102 attaining A×B greater than 500 μm² is desirably used. Here, though the thermal resistance of Si substrate 102 is smaller than 2000 K/W, damage of Si substrate 102 is less likely.

As the thickness of Si substrate 102 is smaller or as the length of the Si substrate in the direction in which the plurality of Si optical waveguides 104 extend is smaller, a time period from the start of change in amount of heat Q generated by heater 107 until generation of temperature difference per unit length in the X-axis direction of substrate 101 due to the change in amount of heat generation Q becomes shorter. This is because the heat capacity of Si substrate 102 is lowered as the volume of Si substrate 102 becomes smaller. Therefore, in the present embodiment, excellent response of OBO planar waveguide device 1 when output port 106 for the signal wave is set or changed is achieved, because the SOI substrate has A×B described above smaller than in the conventional SOI substrate.

Moreover, each of the plurality of Si optical waveguides 104 is implemented by the non-doped Si layer. Accordingly, as compared with Si optical waveguide 104 at a low temperature, further increase in carrier density and greater refractive index are achieved in Si optical waveguide 104 at a high temperature. Therefore, in the plurality of Si optical waveguides 104, difference in the refractive index per unit length in the direction in which the plurality of Si optical waveguides 104 are aligned becomes greater, even though the amount of heat supplied to Si substrate 102 by heater 107 is the same. Namely, if the plurality of Si optical waveguides 104 are implemented by the non-doped Si layer, power consumption of the OBO planar waveguide device is further lowered.

Here, so long as the heater is capable of heating Si substrate 101 and regulating the gradient of temperature distribution in Si substrate 102, heater 107 is not limited to the heater using tantalum nitride, and a heater using nickel-chrome or a Peltier element may be employed. Meanwhile, so long as the heat sink is capable of dissipating heat from substrate 101 to the outside, heat sink 108 is not limited to the heat sink using aluminum nitride, and a heat sink using a material attaining high thermal conductivity such as Cu (copper) or a Peltier element may be employed.

Embodiment 2

An OBO planar waveguide device 2 according to Embodiment 2 of the present invention will now be described with reference to FIGS. 9 to 15. OBO planar waveguide device 2 according to the present embodiment is different from OBO planar waveguide device 1 according to Embodiment 1 in the thickness of an Si substrate 122 and a condition for doping Si substrate 122 with an impurity. On the other hand, the structure and function of an SiO₂ layer 123, an Si optical waveguide 124, an input port 125, an output port 126, a heater 127, and a heat sink 128 in the present embodiment are exactly the same as those of SiO₂ layer 103, Si optical waveguide 104, input port 105, output port 106, heater 107, and heat sink 108 in Embodiment 1, respectively. As shown in the drawings, a direction in which a plurality of Si optical waveguides 124 are aligned is assumed as the X-axis direction, a direction in which each Si optical waveguide 124 extends is assumed as the Y-axis direction, and a direction perpendicular to the X-axis direction and the Y-axis direction is assumed as the Z-axis direction.

Initially, a configuration of aforementioned OBO planar waveguide device 2 will be described with reference to FIGS. 9 and 10.

Si substrate 122 of OBO planar waveguide device 2 according to the present embodiment is doped with P (phosphorus) serving as the impurity at the impurity concentration in a range from $1\times10^{20}$ cm$^{-1}$ to $1\times10^{22}$ cm$^{-3}$. That is, Si substrate 122 of OBO planar waveguide device 2 according to the present embodiment is different in the composition from Si substrate 102 of OBO planar waveguide device 1 according to Embodiment 1. Accordingly, a substrate 121 of OBO planar waveguide device 2 according to the present embodiment has thermal conductivity lower than substrate 101 of OBO planar waveguide device 1 according to Embodiment 1. Si substrate 122 has a thickness of 200 μm, which is smaller than the thickness of Si substrate 102 according to Embodiment 1.

If the concentration of the impurity with which Si substrate 102 is doped is not higher than $1\times10^{20}$ cm$^{-3}$, an effect of lower thermal conductivity of Si substrate 102 as a result of doping with the impurity cannot be obtained. Meanwhile, if the concentration of P in an Si substrate 135 is higher than $1\times10^{20}$ cm$^{-3}$, thermal conductivity of Si substrate 135 is lowered. On the other hand, if the concentration of the impurity is not lower than $1\times10^{22}$ cm$^{-3}$, the characteristic of Si substrate 102 significantly changes, and a desired function of the planar waveguide device may not be obtained. Therefore, the concentration of the impurity in Si substrate 102 is set to be lower than $1\times10^{22}$ cm$^{-3}$.

A method of manufacturing OBO planar waveguide device 2 will now be described with reference to FIGS. 11 to 15.

Initially, Si substrate 135 of an SOI substrate 130, that has a thickness of 600 μm, is doped with phosphorus at the concentration greater than $1\times10^{20}$ cm$^{-3}$ and lower than $1\times10^{22}$ cm$^{-3}$. In this manner, at a room temperature, the thermal conductivity of Si substrate 135 is lowered to a value smaller than approximately half the thermal conductivity of an Si substrate not doped with the impurity, as compared with the thermal conductivity of the Si substrate in Embodiment 1.

Figure 11:
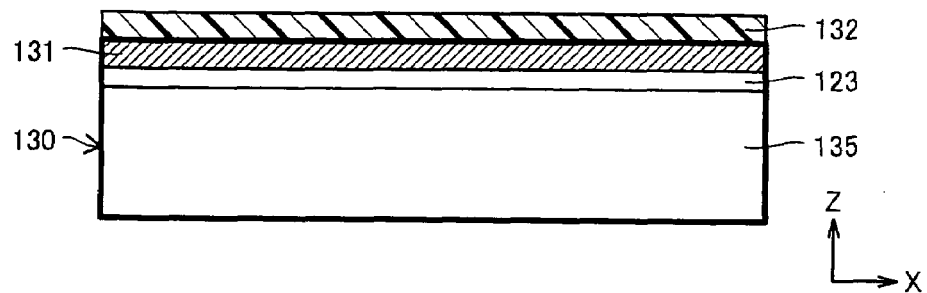
FIGS. 11 to 15 are diagrams illustrating steps of manufacturing OBO planar waveguide device 2 according to Embodiment 2 of the present invention.
Figure 12:
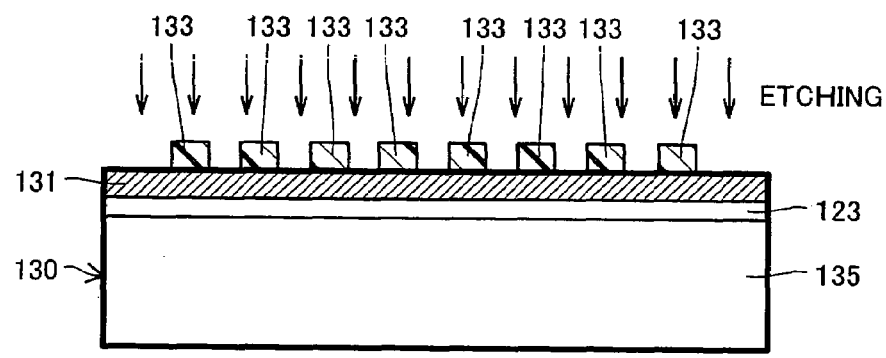

Then, SOI substrate 130 implemented by Si substrate 135, SiO$_2$ layer 123 formed on Si substrate 135, and an Si layer 131 formed on SiO$_2$ layer 123 and having a thickness of 0.3 μm is formed. Thereafter, as shown in FIG. 11, a resist film 132 for electron beam having a thickness of 0.3 μm is applied onto Si layer 131. Thereafter, electron beam direct writing is performed on resist film 132, to form a resist pattern 133 as shown in FIG. 12. In the present embodiment, electron beam direct writing is performed under a condition that beam current of the electron beam is set to 0.1 nA and an electron beam dose time period per 1 dot is set to 4.5 μsec. Alternatively, resist pattern 133 corresponding to Si optical waveguide 124 is formed also by photolithography, in a transfer time period of approximately 10 sec. It is noted that Si layer 131 in the present embodiment is a non-doped layer.

Figure 13:
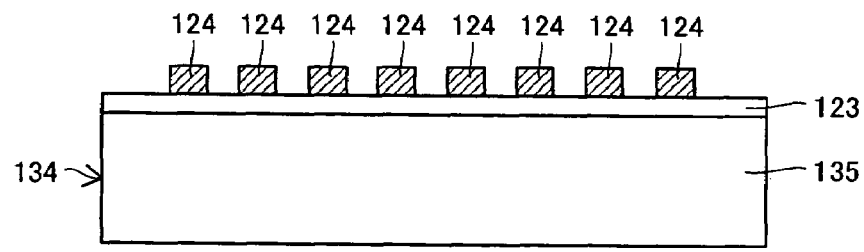

Using resist pattern 133 as a mask, an etching method such as ICP etching, reactive ion etching or reactive ion beam etching is used to etch Si layer 131 as shown in FIG. 12, thereby obtaining Si optical waveguide 124 as shown in FIG. 13. In the present embodiment, reactive ion etching performed under the condition that a mixed gas of chlorine gas of 25 sccm and nitrogen gas of 10 sccm is used as the etching gas, etching pressure is set to 1 Pa, and RF power is set to 200 W is employed.

Figure 14:
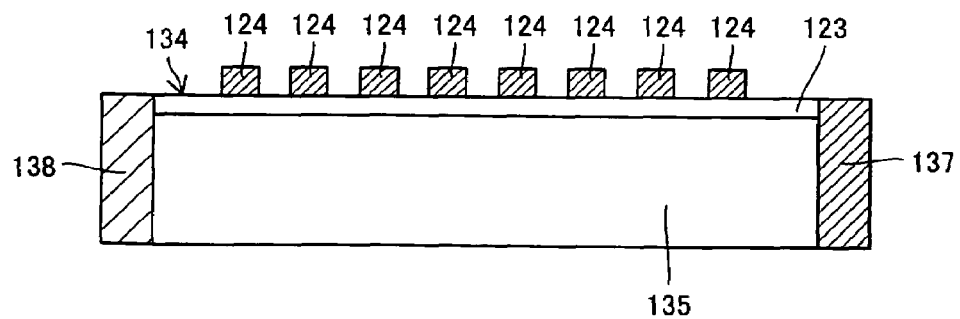

Thereafter, as shown in FIG. 14, sputtering or vapor deposition is used to form a tantalum nitride film 137 serving as heater 127 in one side end portion in the X-axis direction of a substrate 134. In addition, sputtering or vapor deposition is used to form an aluminum nitride film 138 serving as heat sink 128 in the other side end portion in the X-axis direction of substrate 134.

Figure 15:
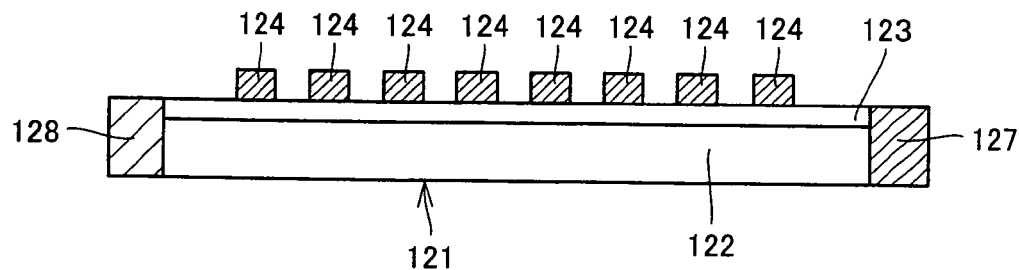

Then, as shown in FIG. 15, the back surface of Si substrate 135 in substrate 134 of OBO planar waveguide device 2 formed with SOI substrate 130 is polished. In the present embodiment, Si substrate 135 is polished until the thickness of substrate 134 is set from 600 μm to approximately 200 μm. Substrate 121 consisting of Si substrate 122, SiO$_2$ layer 123, Si optical waveguide 124, heater 127 made of the tantalum nitride film, and heat sink 128 made of the aluminum nitride film is thus formed. Here, opposing end surfaces of Si optical waveguide 124 serve as input port 125 and output port 126, respectively.

Figure 9:
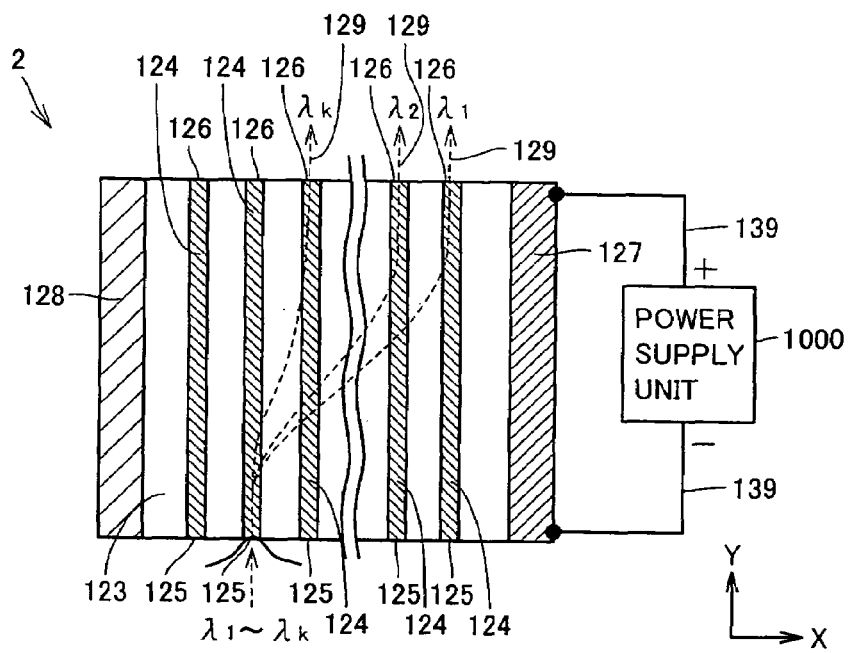
FIG. 9 is a top view of an OBO planar waveguide device 2 according to Embodiment 2 of the present invention.
Figure 10:
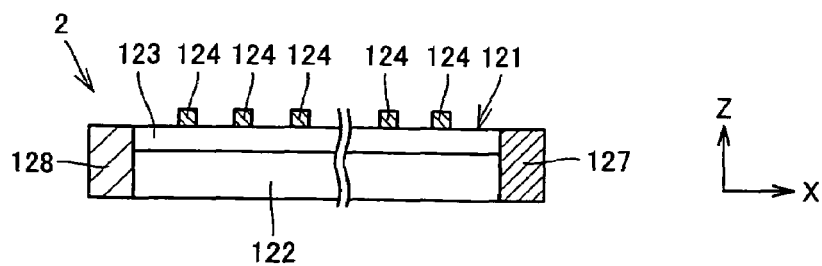
FIG. 10 is a side view of OBO planar waveguide device 2 according to Embodiment 2 of the present invention.

Finally, as shown in FIG. 9, in order to change the temperature of heater 127, one metal line 139 and another metal line 139 are used to connect power supply unit 1000 to heater 127. One metal line 139 is connected to the positive terminal of power supply unit 1000 and one end of heater 127 in the Y-axis direction. Another metal line 139 is connected to the negative terminal of power supply unit 1000 and the other end of heater 127 in the Y-axis direction.

An operation of aforementioned OBO planar waveguide device 2 will now be described with reference to FIGS. 9 and 10.

In the present embodiment, Si substrate 122 is doped with P at a concentration higher than $1\times10^{20}$ cm$^{-3}$. Accordingly, the thermal resistance of Si substrate 122 is approximately twice or higher than the thermal resistance when the substrate is not doped with P. Consequently, if the condition that A×B is smaller than 100000 μm$^2$ is satisfied, thermal resistance Rx is greater than 20 K/W. That is, according to OBO planar waveguide device 2 of the present embodiment, the maximum value of A×B is approximately twice as high as that when Si substrate 122 is not doped with P at a high concentration. Therefore, as a tolerable range of thickness A of Si substrate 122 and length B in the Y-axis direction of Si substrate 122 becomes wider, degree of freedom in design of Si substrate 122 is increased. In addition, if planar waveguide device 2 according to the present embodiment is formed to have the shape and size the same as planar waveguide device 1 according to Embodiment 1, Si substrate 122 of the present embodiment attains thermal resistance approximately twice or higher than that of Si substrate 102 in Embodiment 1. Namely, planar waveguide device 2 according to the present embodiment achieves reduction in power consumption approximately twice or higher than that in conventional planar waveguide device 1.

Though P is used as a dopant to be implanted into Si substrate 122 in the present embodiment, implantation of B (boron) or As (arsenic) into Si substrate 122 as the dopant can attain an effect the same as described above, so long as the doping concentration is greater than $1\times10^{20}$ cm$^{-3}$ and lower than $1\times10^{22}$ cm$^{-3}$ Embodiment 3

Figure 16:
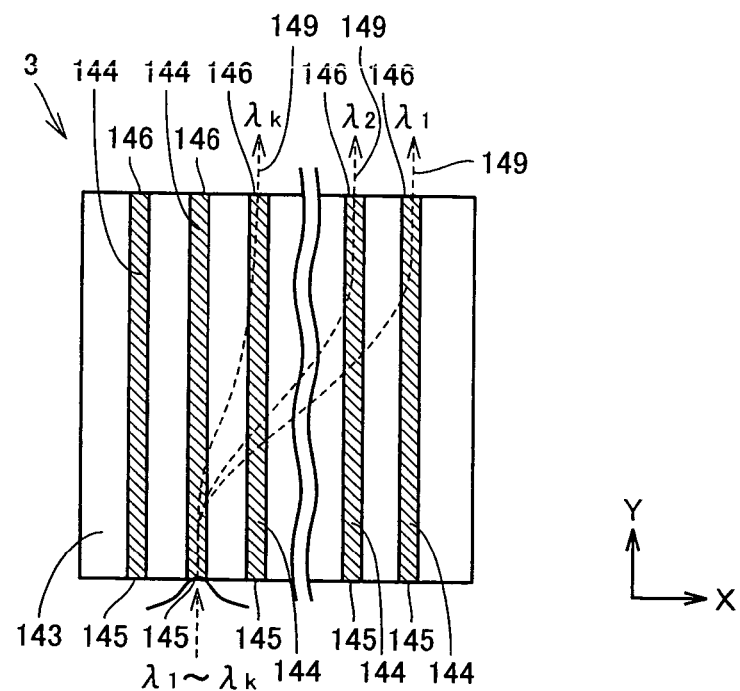
FIG. 16 is a top view of an OBO planar waveguide device 3 according to Embodiment 3 of the present invention.
Figure 17:
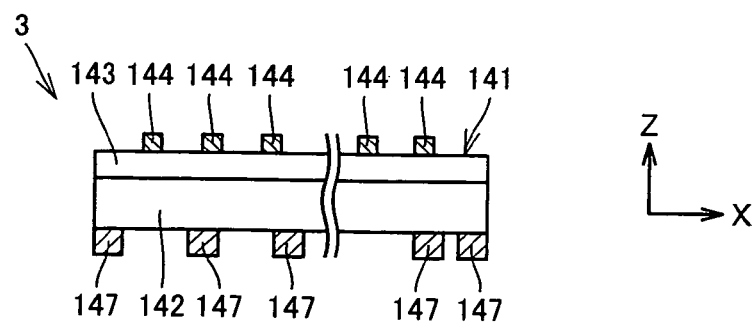
FIG. 17 is a side view of OBO planar waveguide device 3 according to Embodiment 3 of the present invention.
Figure 18:
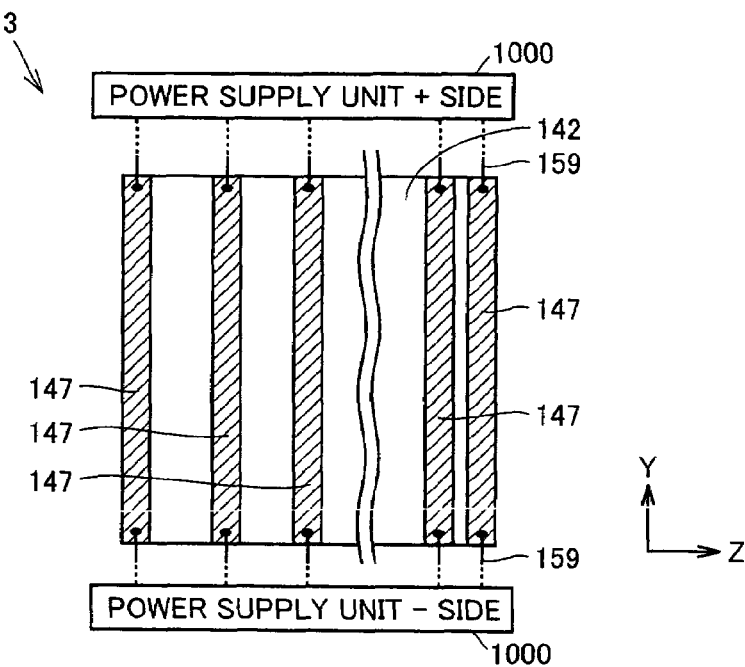
FIG. 18 is a bottom view of OBO planar waveguide device 3 according to Embodiment 3 of the present invention.

An OBO planar waveguide device 3 according to Embodiment 3 of the present invention will now be described with reference to FIGS. 16 to 24. OBO planar waveguide device 3 according to the present embodiment is different from OBO planar waveguide device 1 according to Embodiment 1 in a shape, arrangement pattern and arrangement position of a plurality of heat generating portions 147 implementing the heater as well as in absence of the heat sink. On the other hand, the structure and function of an Si substrate 142, an SiO$_2$ layer 143, an Si optical waveguide 144, an input port 145, and an output port 146 in the present embodiment are exactly the same as those of Si substrate 102, SiO$_2$ layer 103, Si optical waveguide 104, input port 105, and output port 106 in Embodiment 1, respectively. As shown in FIGS. 16 to 18, a direction in which a plurality of Si optical waveguides 144 are aligned is assumed as the X-axis direction, a direction in which each Si optical waveguide 144 extends is assumed as the Y-axis direction, and a direction perpendicular to the X-axis direction and the Y-axis direction is assumed as the Z-axis direction.

Initially, a configuration of aforementioned OBO planar waveguide device 3 will be described with reference to FIGS. 16 to 18.

A substrate 141 of OBO planar waveguide device 3 includes Si substrate 142 having a thickness of 100 µm and $SiO_2$ layer 143 stacked on Si substrate 142 and having a thickness of 1 µm. In addition, a plurality of heat generating portions 147 implementing the heater of the present invention are provided on the main surface on the back side of Si substrate 142, that is, on the main surface where a plurality of optical waveguides 144 are not provided. The plurality of heat generating portions 147 are the same in their shape and size. That is, the plurality of heat generating portions 147 are the same in the amount of heat that they supply to Si substrate 142. Moreover, the direction in which the plurality of heat generating portions 147 are aligned is the same as the direction in which the plurality of Si optical waveguides 144 are aligned, that is, the X-axis direction, and the plurality of heat generating portions 147 extend in parallel to each other, in the direction the same as the direction in which the plurality of Si optical waveguides 144 extend.

Therefore, in the present embodiment, the amount of heat supplied to Si substrate 142 is different, depending on a pitch between adjacent heat generating portions 147. More specifically, the gradient of temperature distribution in the X-axis direction in Si substrate 142 is inversely proportional to the pitch between adjacent heat generating portions 147.

Each of the plurality of heat generating portions 147 extends from one end to the other end of Si substrate 141 along the Y-axis direction, on the back main surface of Si substrate 142, and has a rectangular shape. In addition, the plurality of heat generating portions 147 are arranged in such a pattern that the pitch between adjacent heat generating portions 147 gradually becomes greater or smaller in the X-axis direction, that is, in a chirp pattern. Therefore, the temperature gradient of Si substrate 142 gradually becomes greater or smaller along the X-axis direction, for each part corresponding to a region between adjacent heat generating portions 147.

A method of manufacturing OBO planar waveguide device 3 having the plurality of heat generating portions 147 in a chirp pattern will now be described with reference to FIGS. 19 to 24.

Figure 19:
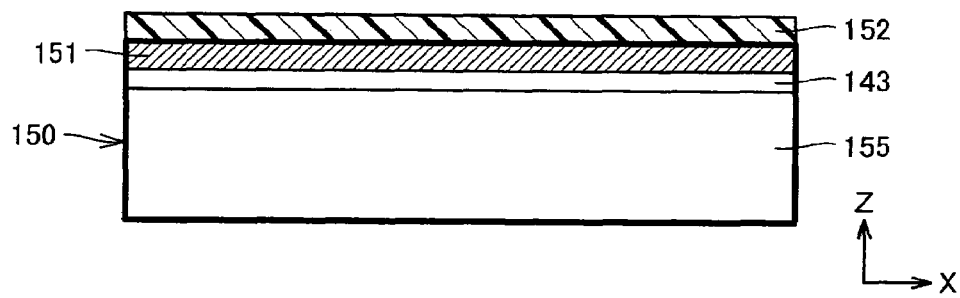
FIGS. 19 to 24 are diagrams illustrating steps of manufacturing OBO planar waveguide device 3 according to Embodiment 3 of the present invention.
Figure 20:
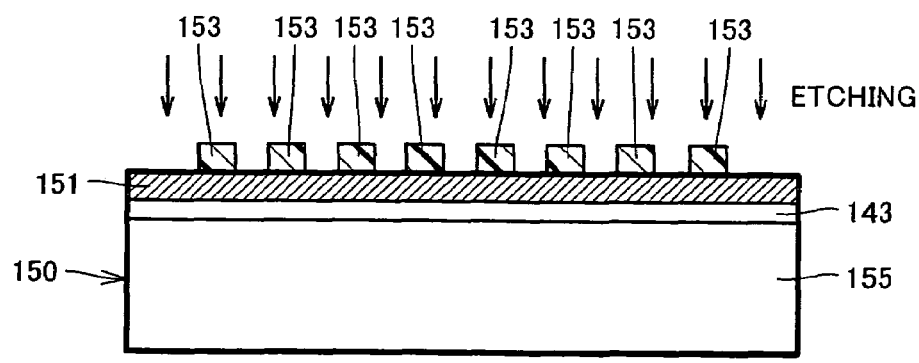

Initially, an SOI substrate 150 implemented by stacking an Si substrate 155, $SiO_2$ layer 143, and an Si layer 151 having a thickness of 0.3 µm in this order is prepared. Thereafter, as shown in FIG. 19, a resist film 152 for electron beam having a thickness of 0.3 µm is applied onto Si layer 151. Thereafter, electron beam direct writing is used to process resist film 152, to form a resist pattern 153 as shown in FIG. 20. In the present embodiment, electron beam direct writing is performed under a condition that beam current of the electron beam is set to 0.1 nA and an electron beam dose time period per 1 dot is set to 4.5 µsec. Alternatively, resist pattern 153 is obtained also by photolithography, in a transfer time period of approximately 10 sec. It is noted that Si layer 151 in the present embodiment is a non-doped layer.

Figure 21:
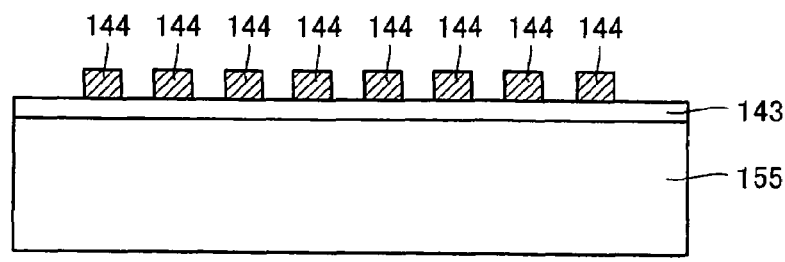

Using resist pattern 153 as a mask, an etching method such as ICP etching, reactive ion etching or reactive ion beam etching is used to etch Si layer 151 as shown in FIG. 20, thereby obtaining the plurality of Si optical waveguides 144 as shown in FIG. 21. In the present embodiment, reactive ion etching performed under the condition that a mixed gas of chlorine gas of 25 sccm and nitrogen gas of 10 sccm is used as the etching gas, etching pressure is set to 1 Pa, and RF power is set to 200 W is employed.

Figure 22:
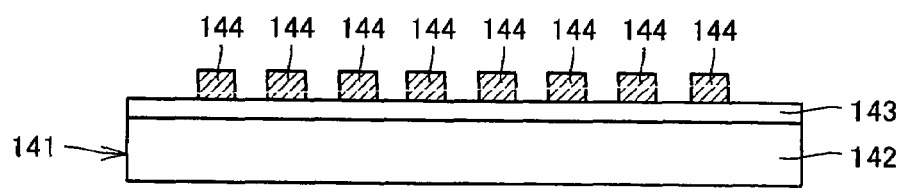

Then, as shown in FIG. 22, the back surface of Si substrate 155 of OBO planar waveguide device 3 formed with SOI substrate 150 is polished. In the present embodiment, the back surface of Si substrate 155 is polished until the thickness of a substrate 154 is set from 600 µm to approximately 100 µm. Substrate 141 consisting of Si substrate 142, $SiO_2$ layer 143 and Si optical waveguide 144 is thus formed.

Figure 23:
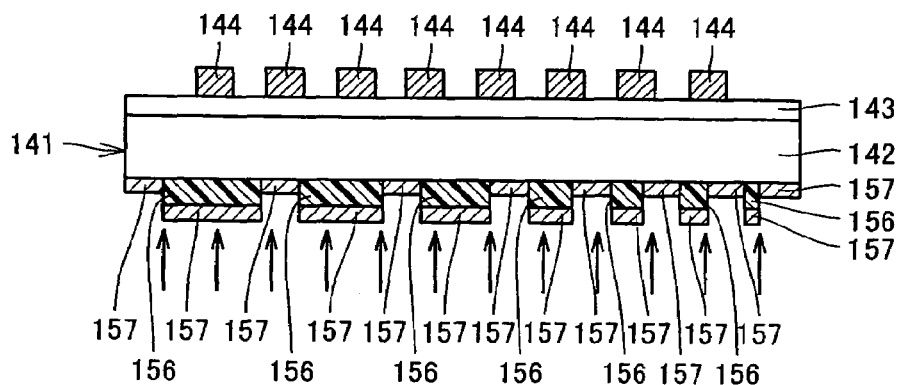
Figure 24:
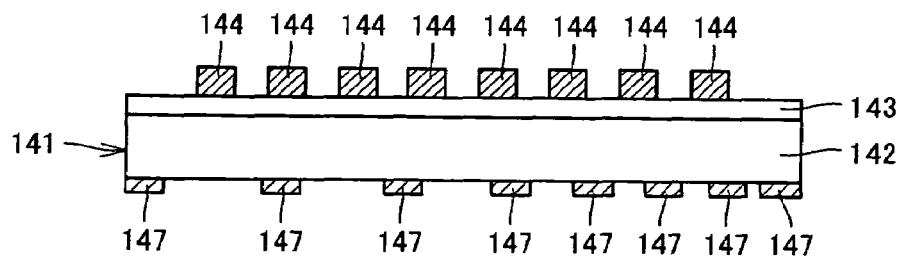

Thereafter, electron beam direct writing or photolithography is used to form a resist pattern 156, in order to form heaters 147 in a chirp pattern on the back surface of Si substrate 141 having a thickness of 100 µm. As shown in FIG. 23, sputtering or vapor deposition is used to form a tantalum nitride film 157 so as to cover resist pattern 156 and the back surface of Si substrate 141. Thereafter, a lift-off method is used to remove resist pattern 156 and tantalum nitride film 157 formed thereon form the back surface of Si substrate 141. The plurality of heat generating portions 147 in a chirp pattern are thus formed as shown in FIG. 24. It is noted that opposing ends of optical waveguide 144 serve as input port 145 and output port 146, respectively.

Finally, power supply unit 1000 is connected to the plurality of heat generating portions 147. One ends of a plurality of metal lines 159 are connected to the positive terminal and the negative terminal of power supply unit 1000. In addition, the other ends of the plurality of metal lines 159 are connected to opposing ends in the Y-axis direction of the plurality of heat generating portions 147. Namely, one ends of the plurality of heat generating portions 147 are connected to the positive terminal of power supply unit 1000 through metal lines 159, while the other ends of the plurality of heat generating portions 147 are connected to the negative terminal of power supply unit 1000 through metal lines 159. In other words, one end portions of the plurality of heat generating portions 147 are electrically connected to the − terminal of power supply unit 1000, while the other end portions thereof are electrically connected to the + terminal of power supply unit 1000. Here, the same voltage is applied to each of the plurality of heat generating portions 147.

How the plurality of heat generating portions 147 aligned in a chirp pattern control the temperature difference per unit length in the X-axis direction of substrate 140 will now be described in detail with reference to FIGS. 16 to 18.

If the heater having the plurality of heat generating portions 147 in the chirp pattern is employed, number density of the plurality of heat generating portions 147 monotonously increases or decreases in the X-axis direction of Si substrate 142 surface. Namely, the pitch between the adjacent heat generating portions among the plurality of heat generating portions 147 monotonously increases or decreases in the X-axis direction.

If the plurality of heat generating portions 147 in the chirp pattern have the same size and shape in the planar waveguide device according to the present embodiment, the same amount of power is consumed and the same amount of heat is dissipated. Accordingly, a portion in Si substrate 142 where number density of heat generating portions 147 is great attains to a relatively high temperature, while a portion in Si substrate 142 where number density of heat generating portions 147 is small attains to a relatively low temperature.

More specifically, with regard to relation between combinations of the adjacent heat generating portions among the plurality of heat generating portions 147, the gradient of temperature distribution in the X-axis direction of Si substrate 142 decreases or increases, in a manner corresponding to the increase or decrease in the pitch between the two heat generating portions in the X-axis direction. In summary, the number density of the two adjacent heat generating portions in the X-axis direction corresponds to the gradient of temperature distribution of Si substrate 142

If power consumption of each of the plurality of heat generating portions 147 is individually controlled, the temperature difference per unit length in the X-axis direction of Si substrate 142 can more precisely be controlled, and therefore, excellent controllability of OBO planar waveguide device 3 can be achieved.

In the planar waveguide device according to the present embodiment in which the plurality of heat generating portions 147 are provided on the back surface of Si substrate 142, desired gradient of temperature distribution of Si substrate 142 is formed as a result of heat conduction in the direction of thickness (Z-axis direction) of Si substrate 142. On the other hand, in the planar waveguide devices according to Embodiments 1 and 2 described previously employing the heater implemented by providing one heat generating portion on the side end surface of the Si substrate, desired gradient of temperature distribution of Si substrate 142 is formed as a result of heat conduction from one end to the other end in the X-axis direction of Si substrate 142. Accordingly, the planar waveguide device of the present embodiment requires a time period for forming desired temperature distribution of Si substrate 142 much shorter than the planar waveguide devices in Embodiments 1 and 2 described previously. Therefore, as the time period for setting or changing output port 146 for the signal wave demultiplexed in OBO planar waveguide device 3 can be shortened, response of OBO planar waveguide device 3 can be improved.

Embodiment 4

An OBO planar waveguide device 4 will be described with reference to FIGS. 25 to 33. OBO planar waveguide device 4 according to the present embodiment is different from OBO planar waveguide device 3 according to Embodiment 3 in arrangement pattern of a plurality of heat generating portions 167 and a manner of electrical connection between power supply unit 1000 and the plurality of heat generating portions 167. On the other hand, the structure and function of an Si substrate 162, an $SiO_2$ layer 163, an Si optical waveguide 164, an input port 165, and an output port 166 in the present embodiment are exactly the same as those of Si substrate 142, $SiO_2$ layer 143, Si optical waveguide 144, input port 145, and output port 146 in Embodiment 3, respectively. Here, as shown in FIGS. 25 to 33, a direction in which a plurality of Si optical waveguides 164 are aligned is assumed as the X-axis direction, a direction in which each Si optical waveguide 164 extends is assumed as the Y-axis direction, and a direction perpendicular to the-X-axis direction and the Y-axis direction is assumed as the Z-axis direction.

Figure 25:
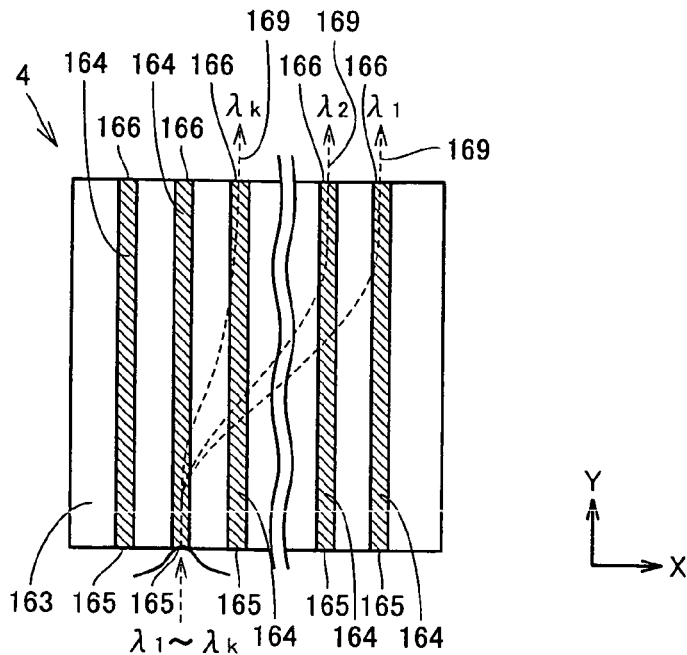
FIG. 25 is a top view of an OBO planar waveguide device 4 according to Embodiment 4 of the present invention.
Figure 26:
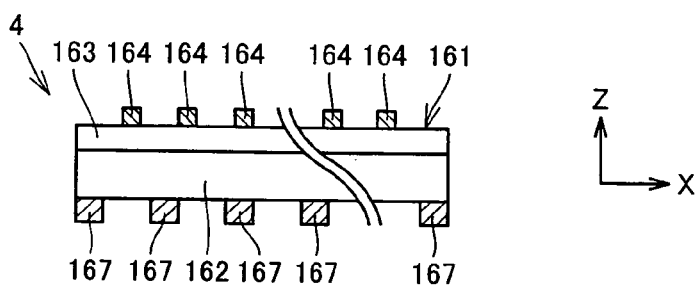
FIG. 26 is a side view of OBO planar waveguide device 4 according to Embodiment 4 of the present invention.
Figure 27:
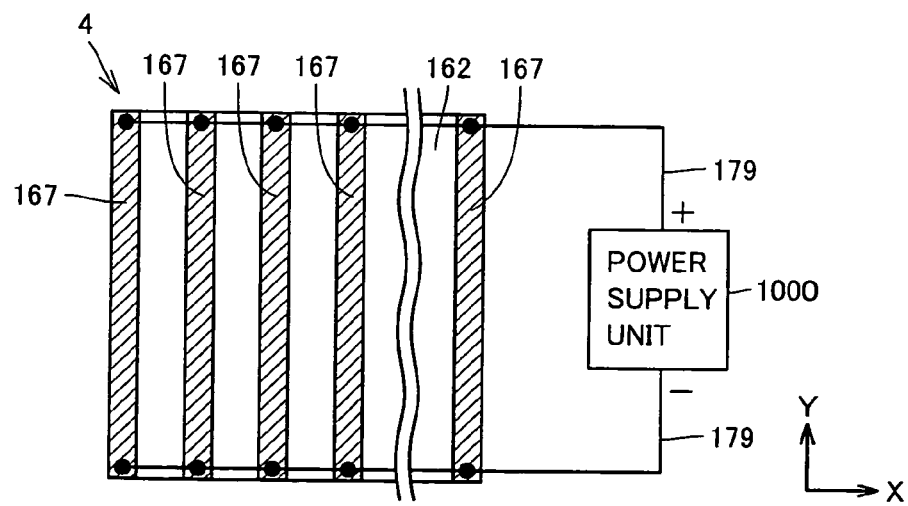
FIG. 27 is a bottom view of OBO planar waveguide device 4 according to Embodiment 4 of the present invention.
Figure 28:
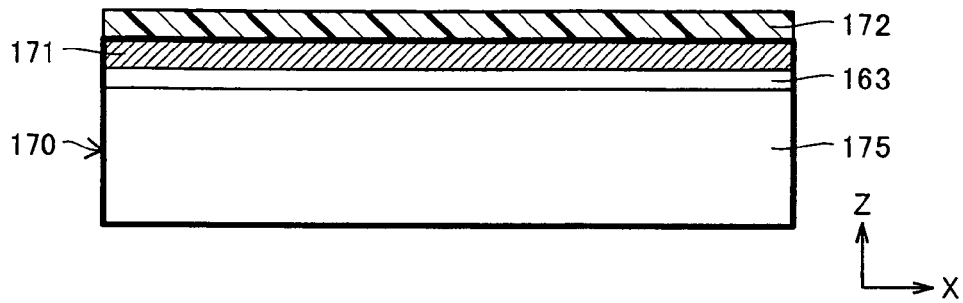
FIGS. 28 to 34 are diagrams illustrating steps of manufacturing OBO planar waveguide device 4 according to Embodiment 4 of the present invention.
Figure 29:
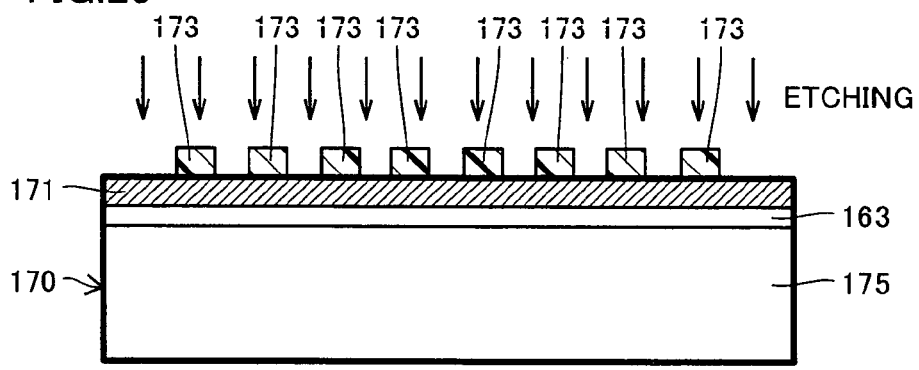
Figure 30:
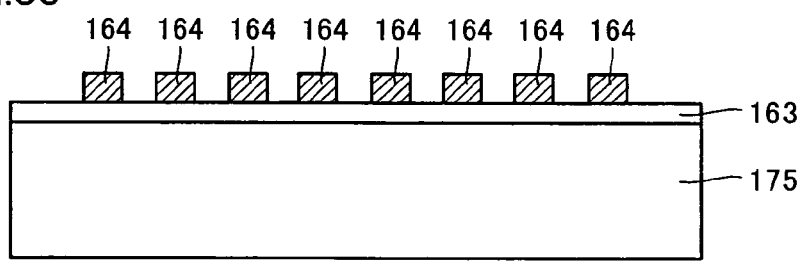
Figure 31:
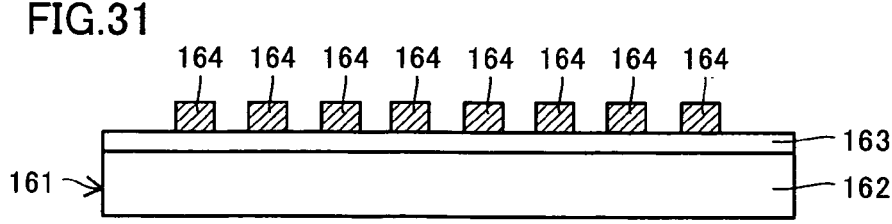

Initially, a configuration of aforementioned OBO planar waveguide device 4 will be described with reference to FIGS. 25 to 27.

The plurality of heat generating portions 167 the same in the shape and size are provided on the back surface of Si substrate 162. Accordingly, the plurality of heat generating portions 167 are the same in the amount of heat that they supply to Si substrate 162. The plurality of heat generating portions 167 extend in parallel to each other from one end to the other end, in the Y-axis direction on the main surface of Si substrate 162, and each of them has a rectangular shape. The plurality of heat generating portions 167 are arranged such that the pitch between adjacent heat generating portions 167 is equal in the X-axis direction.

One ends of wires 179 are connected to the positive terminal and the negative terminal of power supply unit 1000 respectively. The other ends of two wires 179 are connected to respective end portions of heat generating portion 167 located on the outermost side in the X-axis direction of a substrate 161. In addition, between heat generating portion 167 connected to wire 179 and heat generating portion 167 adjacent to the former heat generating portion 167, wire 179 connects corresponding end portions of the heat generating portions to each other. Moreover, also between other heat generating portions 167 adjacent to each other, wire 179 connects corresponding end portions of the heat generating portions to each other. In the present embodiment, wire 179 is implemented by a nickel-chrome wire having a prescribed resistance value. Here, the voltage applied to each of the plurality of heat generating portions 167 by power supply unit 1000 depends on the length of wire 179 between power supply unit 1000 and heat generating portion 167. In addition, heat in an amount in accordance with the voltage applied to heat generating portion 167 is supplied from heat generating portion 167 to Si substrate 162.

A method of manufacturing OBO planar waveguide device 4 according to the present embodiment will now be described with reference to FIGS. 28 to 34.

As the steps in the method of manufacturing OBO planar waveguide device 4 according to the present embodiment shown in FIGS. 28 to 31 are the same as those in the method of manufacturing OBO planar waveguide device 3 according to Embodiment 3 shown in FIGS. 19 to 22, description of these steps will not be repeated. It is noted that an Si substrate 175, $SiO_2$ layer 163, an Si layer 171, a resist film 172, a resist pattern 173, and optical waveguide 164 shown in FIGS. 28 to 31 correspond to Si substrate 155, $SiO_2$ layer 143, Si layer 151, resist film 152, resist pattern 153, and optical waveguide 144 shown in FIGS. 19 to 22, respectively.

Figure 32:
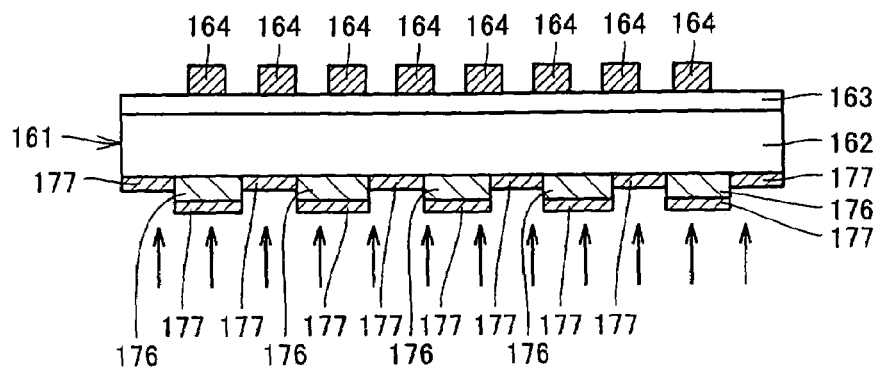
Figure 33:
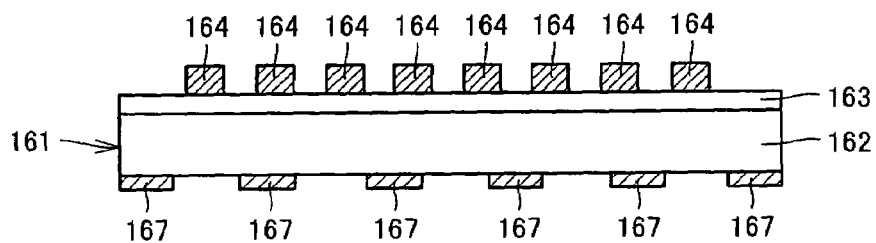

Thereafter, electron beam direct writing or photolithography is used to form a resist pattern 176 on the back surface of Si substrate 175 having a thickness of 100 μm. Thereafter, as shown in FIG. 32, sputtering or vapor deposition is used to form a tantalum nitride film 177 so as to cover resist pattern 176 and the back surface of Si substrate 175. Thereafter, a lift-off method is used to remove resist pattern 176 and tantalum nitride film 177 formed thereon from Si substrate 175, to form the plurality of heat generating portions 167 formed from the tantalum nitride film as shown in FIG. 33. It is noted that opposing ends of optical waveguide 164 serve as input port 165 and output port 166, respectively.

Figure 34:
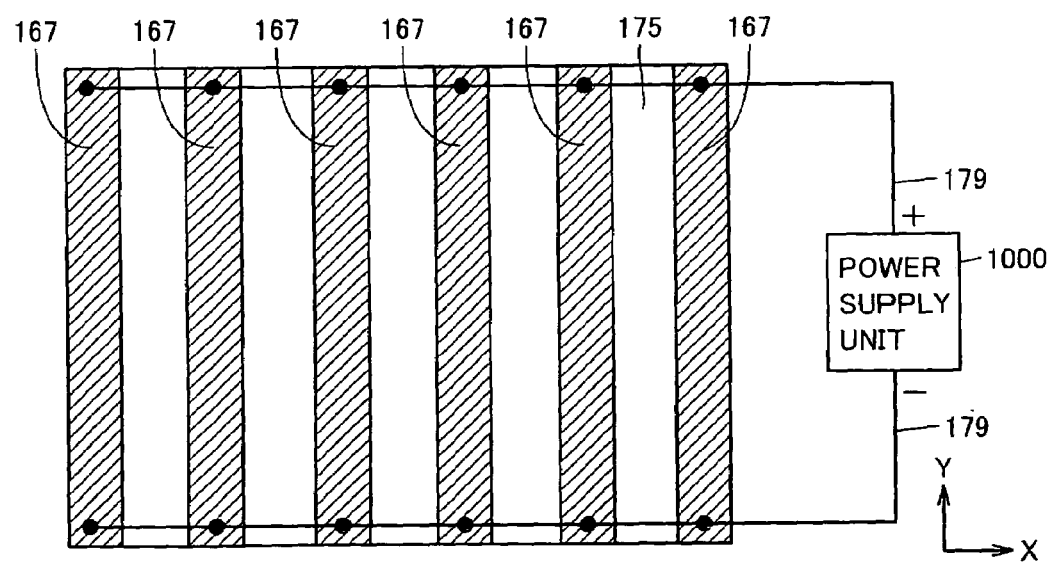

Finally, the plurality of heat generating portions 167 are connected in parallel with respect to power supply unit 1000 via two wires 179, as shown in FIG. 34.

An operation of aforementioned OBO planar waveguide device 4 will now be described with reference to FIGS. 25 to 27.

In the planar waveguide device according to the present embodiment, the plurality of heat generating portions 167 connected in parallel are used to regulate the temperature difference per unit length in the X-axis direction of substrate 161. The difference in the refractive index per unit length in the X-axis direction of Si optical waveguide 164 is thus controlled. Consequently, the amplitude of OBO of the demultiplexed signal wave can be regulated using heater 167, to freely designate output port 166 for the signal wave.

How heater 167 implemented by connecting the plurality of heat generating portions 167 in parallel is used to control the temperature difference per unit length in the X-axis direction of substrate 161 will now be described in detail with reference to FIGS. 25 to 27 and 35.

Figure 35:
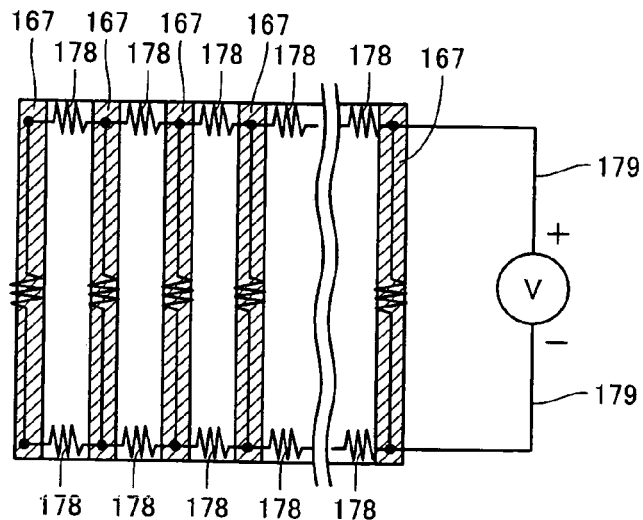
FIG. 35 is an equivalent circuit diagram of OBO planar waveguide device 4 according to Embodiment 4 of the present invention.

FIG. 35 is an equivalent circuit diagram of power supply unit 1000, wire 179 and the plurality of heat generating portions 167. In the equivalent circuit, wire 179 is drawn as a resistor 178. As shown in FIG. 35, as wire 179 connecting power supply unit 1000 and heat generating portions 167 to each other is longer, a greater number of resistors 178 are present between power supply unit 1000 and heat generating portions 167, and the voltage applied across the ends of heat generating portion 167 becomes smaller. Therefore, the greatest voltage is applied to heat generating portion 167 located closest to power supply unit 1000 in the X-axis direction and directly connected to power supply unit 1000 through wire 179, and the second greatest voltage is applied to heat generating portion 167 adjacent to heat generating portion 167 connected to power supply unit 1000. Meanwhile, as heat generating portion 167 is located farther from power supply unit 1000 in the X-axis direction, a voltage applied to heat generating portion 167 becomes smaller. Accordingly, heat generating portion 167 closer to power supply unit 1000 in the X-axis direction attains to a higher temperature, while heat generating portion 167 located farther from power supply unit 1000 attains to a lower temperature. Consequently, the gradient of temperature distribution is generated in the X-axis direction of Si substrate 162.

More specifically, with regard to relation between combinations of two adjacent heat generating portions 167 among the plurality of heat generating portions 167, a ratio of difference in the voltage applied to two heat generating portions 167 to the pitch between two heat generating portions 167 corresponds to the gradient of temperature distribution of Si substrate 162. In the present embodiment, the pitch between adjacent heat generating portions 167 among the plurality of heat generating portions 167 is the same in any combination, and the amount of heat generated by heat generating portion 167 is proportional to the applied voltage. Therefore, the gradient of temperature distribution of the Si substrate is determined by the difference in the voltage applied to two adjacent heat generating portions 167.

According to OBO planar waveguide device 4 of the present embodiment as above, single power supply unit 1000 controls the temperature of the plurality of heat generating portions 167. Therefore, control of OBO planar waveguide device 4 can be facilitated.

It is noted that a material for wire 179 is not limited to nickel-chrome, so long as a voltage is applied to each of the plurality of heat generating portions 167 and temperature difference originating from the difference in the applied voltage is made among the plurality of heat generating portions 167.

Embodiment 5

Figure 36:
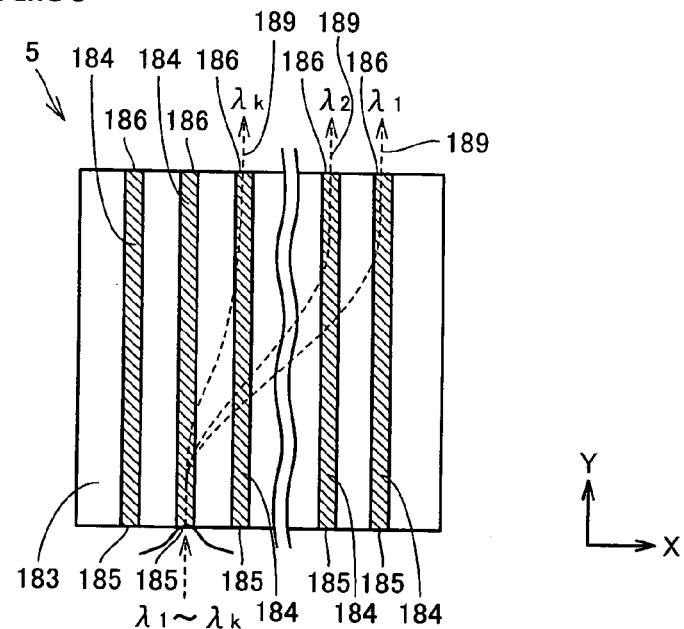
FIG. 36 is a top view of an OBO planar waveguide device 5 according to Embodiment 5 of the present invention.
Figure 37:
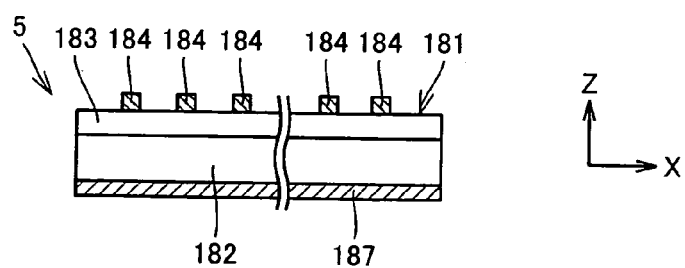
FIG. 37 is a side view of OBO planar waveguide device 5 according to Embodiment 5 of the present invention.
Figure 38:
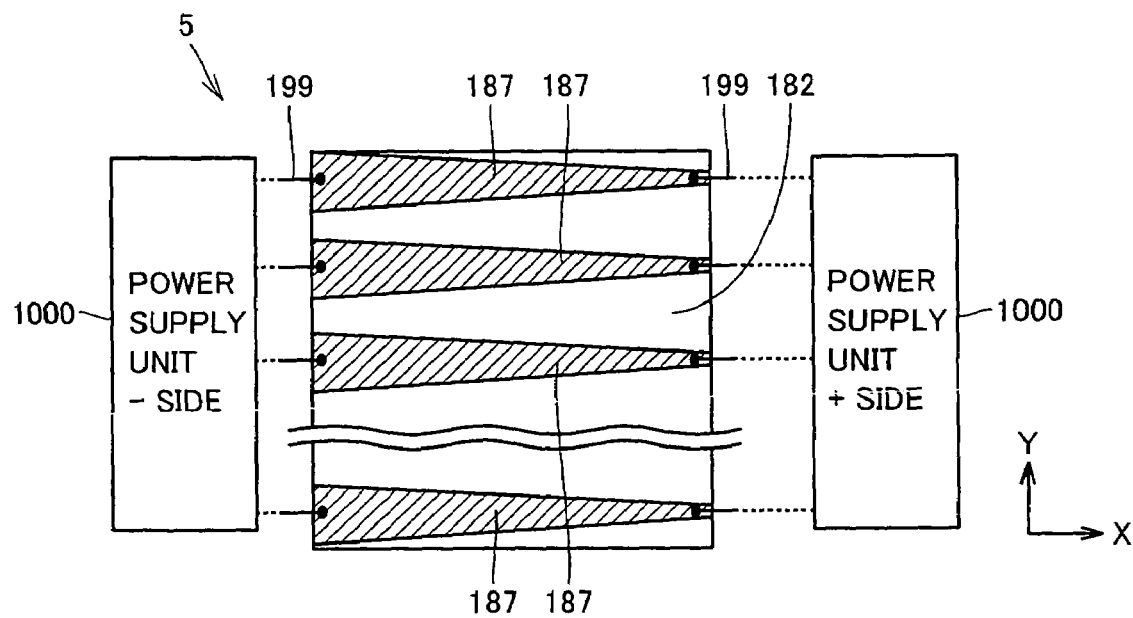
FIG. 38 is a bottom view of OBO planar waveguide device 5 according to Embodiment 5 of the present invention.

An OBO planar waveguide device 5 according to Embodiment 5 of the present invention will now be described with reference to FIGS. 36 to 40. OBO planar waveguide device 5 according to the present embodiment is different from OBO planar waveguide device 3 according to Embodiment 3 in the shape and arrangement pattern of a plurality of heat generating portions 187. On the other hand, the structure and function of an Si substrate 182, an $SiO_2$ layer 183, an Si optical waveguide 184, an input port 185, and an output port 186 in the present embodiment are exactly the same as those of Si substrate 142, $SiO_2$ layer 143, Si optical waveguide 144, input port 145, and output port 146 in Embodiment 3, respectively. As shown in FIGS. 36 to 38, a direction in which a plurality of Si optical waveguides 184 are aligned is assumed as the X-axis direction, a direction in which each Si optical waveguide 184 extends is assumed as the Y-axis direction, and a direction perpendicular to the X-axis direction and the Y-axis direction is assumed as the Z-axis direction.

Initially, a configuration of aforementioned OBO planar waveguide device 5 will be described with reference to FIGS. 36 to 38.

A plurality of heat generating portions 187 the same in the shape and size are provided on the back surface of Si substrate 182. The plurality of heat generating portions 187 extend from one end to the other end in the X-axis direction on the back surface of Si substrate 182, and a width thereof in the Y-axis direction is proportionally varied. Specifically, in the X-axis direction, a width of each of the plurality of heat generating portions 187 gradually becomes smaller toward the + side of power supply unit 1000. In other words, in the X-axis direction, a width of heater 187 gradually becomes greater toward the − side of power supply unit 1000. In addition, the plurality of heat generating portions 187 extend along the X-axis, and they are aligned along the same direction at a regular pitch in the Y-axis direction. Namely, the plurality of heat generating portions 187 extend along a direction perpendicular to the direction in which a plurality of Si optical waveguides 182 extend. In the present embodiment, the pitch between the heat generating portions refers to a distance between central axes of two adjacent heat generating portions having a symmetrical trapezoidal shape.

Figure 39:
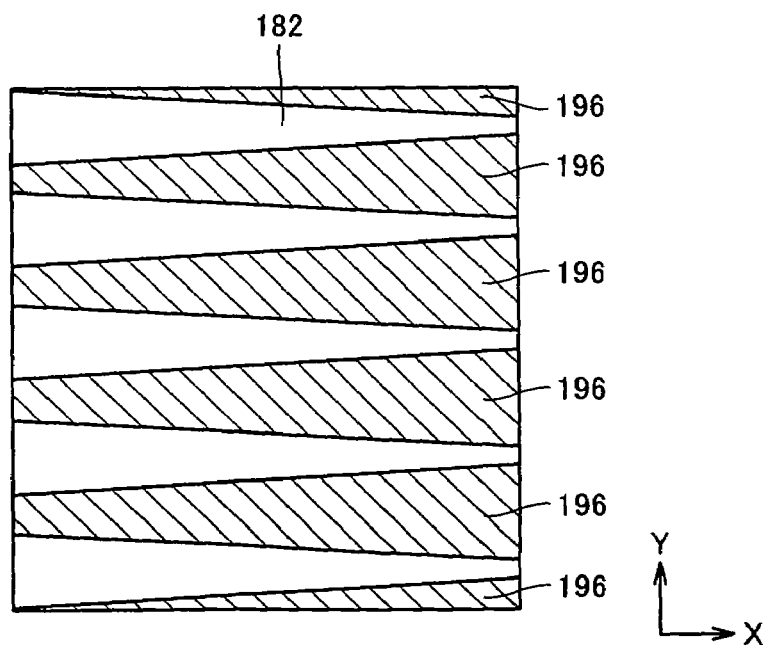
FIGS. 39 and 40 are diagrams illustrating steps of manufacturing OBO planar waveguide device 5 according to Embodiment 5 of the present invention.
Figure 40:
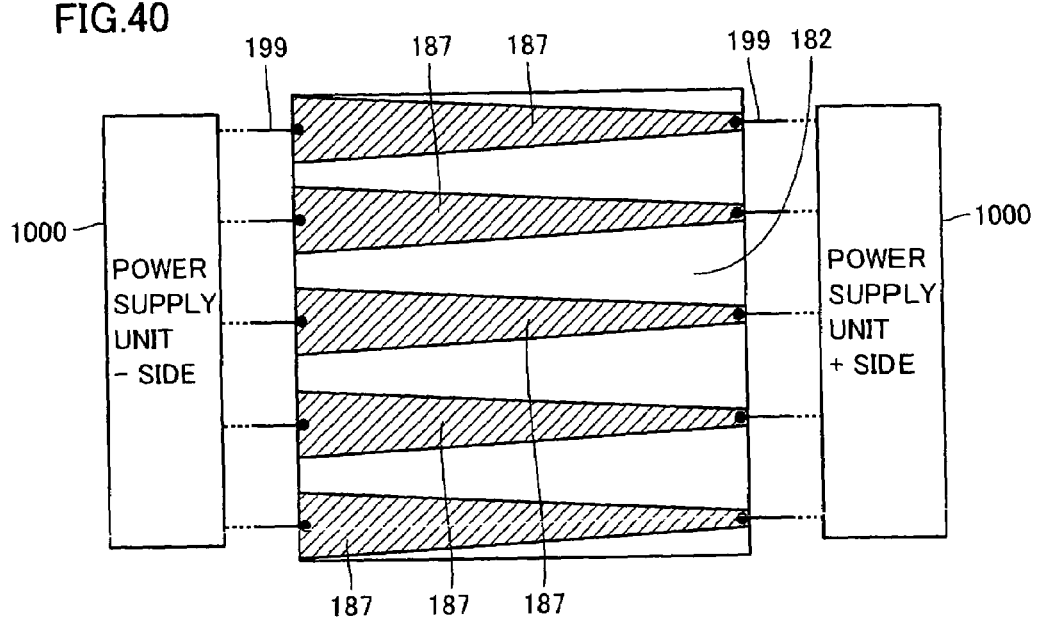

A method of manufacturing OBO planar waveguide device 5 having heaters 187 aligned in the Y-axis direction will now be described with reference to FIGS. 39 and 40.

A resist pattern 196 for forming a heat generating portion 187, used in the method of manufacturing the OBO planar waveguide device in the present embodiment, is different in shape and arrangement from resist pattern 156 used in the method of manufacturing OBO planar waveguide device 3 in Embodiment 3. Meanwhile, Si substrate 182, $SiO_2$ layer 183, the resist pattern for forming Si optical waveguide 184, the material for heat generating portion 187, and the method of forming each member in the present embodiment are exactly the same as Si substrate 142, $SiO_2$ layer 143, resist pattern 153 for forming Si optical waveguide 144, the material for heat generating portion 157, and the method of forming each member in Embodiment 3, respectively.

Power supply unit 1000 is connected to each of the plurality of heat generating portions 187, in order to change the temperature of the plurality of heat generating portions 187. One ends of metal lines 199 are connected to the positive terminal and the negative terminal of power supply unit 1000. The other ends of the plurality of metal lines 199 are attached to side end portions in the X-axis direction of the plurality of heat generating portions 187. Namely, one end portions of the plurality of heat generating portions 187 are connected to the − terminal of power supply unit 1000, while the other end portions thereof are connected to the + terminal of power supply unit 1000. In other words, each of the plurality of heat generating portions 187 is electrically connected to power supply unit 1000 through metal line 199. Here, the same voltage is applied to each of the plurality of heat generating portions 187.

An operation of aforementioned OBO planar waveguide device 5 will now be described with reference to FIGS. 36 to 38.

Here, the plurality of heat generating portions 187 aligned in the Y-axis direction are used to regulate the temperature difference per unit length in the X-axis direction of a substrate 181. The difference in the refractive index per unit length in the X-axis direction of Si optical waveguide 184 is thus controlled. Therefore, magnitude of the amplitude of OBO of the demultiplexed signal wave can be regulated using the plurality of heaters 187, to freely designate output port 186 for the signal wave.

How the plurality of heat generating portions 187 aligned in the Y-axis direction control the temperature difference per unit length in the X-axis direction of the substrate will now be described in detail with reference to FIGS. 36 to 38.

The plurality of heat generating portions 187 are the same in the shape and size. Accordingly, when a two-dimensionally viewed width in the Y-axis direction of each of the plurality of heat generating portions 187 decreases or increases proportionally in the X-axis direction, the total of the two-dimensionally viewed widths of the plurality of heat generating portions 187 in the Y-axis direction also decreases or increases proportionally. Then, the resistance value of the plurality of heat generating portions 187 accordingly increases or decreases proportionally in the X-axis direction. Therefore, the temperature of the plurality of heat generating portions 187 becomes higher or lower in the X-axis direction proportionally. Consequently, when the voltage of the same magnitude is applied to all the plurality of heat generating portions 187, the gradient of temperature distribution in the X-axis direction of substrate 181 is generated. Therefore, if solely a single voltage value of power supply unit 1000 is regulated, the temperature difference per unit length in the X-axis direction of the substrate can be controlled. Consequently, excellent controllability of OBO planar waveguide device 5 is achieved.

Embodiment 6

Figure 41:
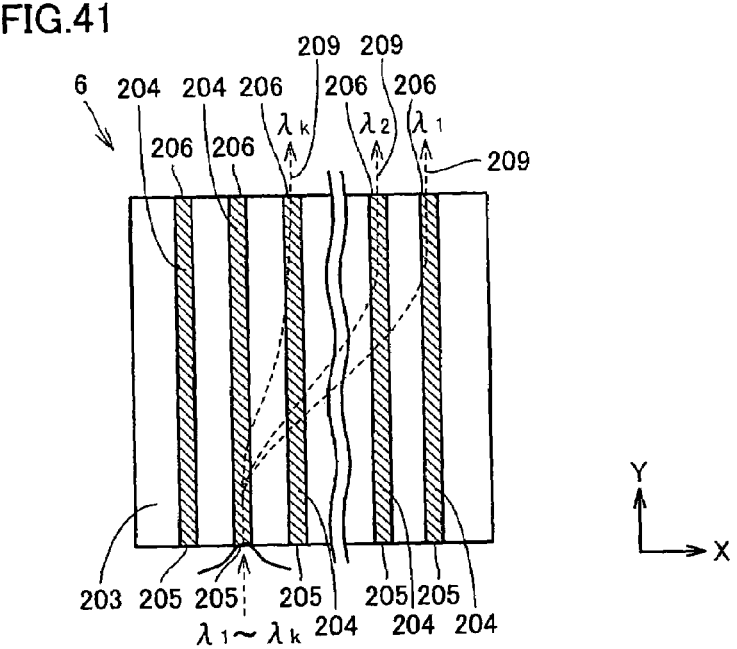
FIG. 41 is a top view of an OBO planar waveguide device 6 according to Embodiment 6 of the present invention.
Figure 42:
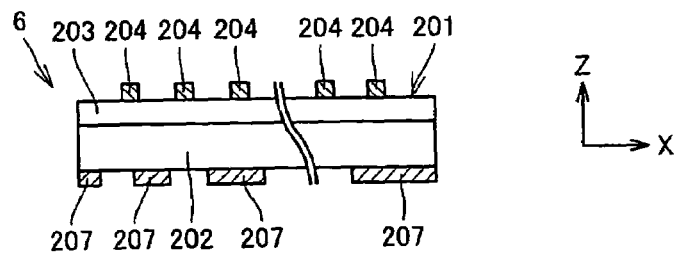
FIG. 42 is a side view of OBO planar waveguide device 6 according to Embodiment 6 of the present invention.
Figure 43:
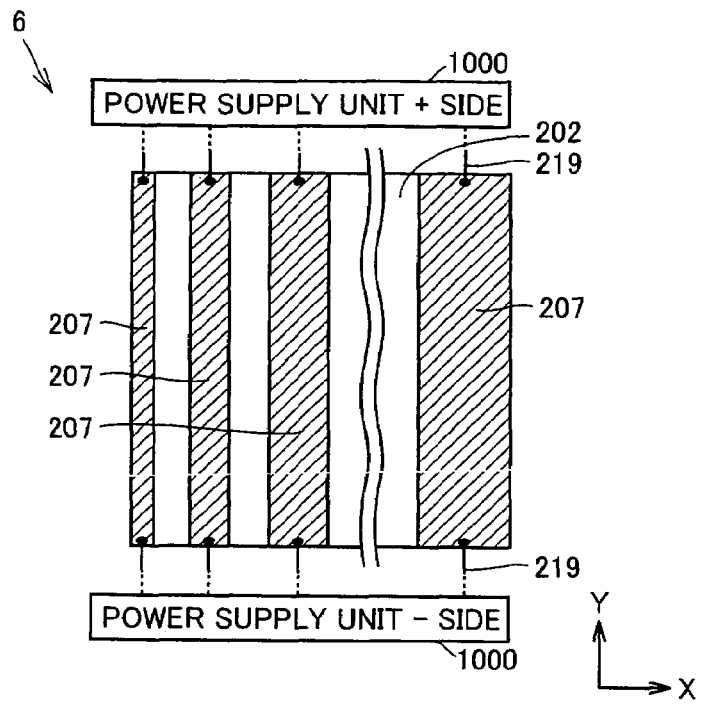
FIG. 43 is a bottom view of OBO planar waveguide device 6 according to Embodiment 6 of the present invention.

An OBO planar waveguide device 6 according to Embodiment 6 of the present invention will now be described with reference to FIGS. 41 to 45. OBO planar waveguide device 6 according to the present embodiment is different from OBO planar waveguide device 3 according to Embodiment 3 in the shape and arrangement pattern of heat generating portions 207. On the other hand, the structure and function of an Si substrate 202, an SiO$_2$ layer 203, an Si optical waveguide 204, an input port 205, and an output port 206 in the present embodiment are exactly the same as those of Si substrate 142, SiO$_2$ layer 143, Si optical waveguide 144, input port 145, and output port 146 in Embodiment 3, respectively. As shown in FIGS. 41 to 43, a direction in which a plurality of Si optical waveguides 144 are aligned is assumed as the X-axis direction, a direction in which each Si optical waveguide 144 extends is assumed as the Y-axis direction, and a direction perpendicular to the X-axis direction and the Y-axis direction is assumed as the Z-axis direction.

Initially, a configuration of aforementioned OBO planar waveguide device 6 will be described with reference to FIGS. 41 to 43.

A plurality of heat generating portions 207 different in width in the X-axis direction are provided on the back surface of Si substrate 202. The plurality of heat generating portions 207 have a rectangular shape and they are equal in length in the Y-axis direction. Accordingly, the area of each of the plurality of heat generating portions 207 is proportional to the width.

Each of the plurality of heat generating portions 207 extends from one end to the other end in the Y-axis direction on the back surface of Si substrate 202, and has such a rectangular shape that its longitudinal direction extends in parallel to the Y-axis direction. In addition, the plurality of heat generating portions 207 are aligned in parallel to each other, such that a two-dimensionally viewed area gradually increases or decreases in the order of arrangement in the X-axis direction.

Figure 44:
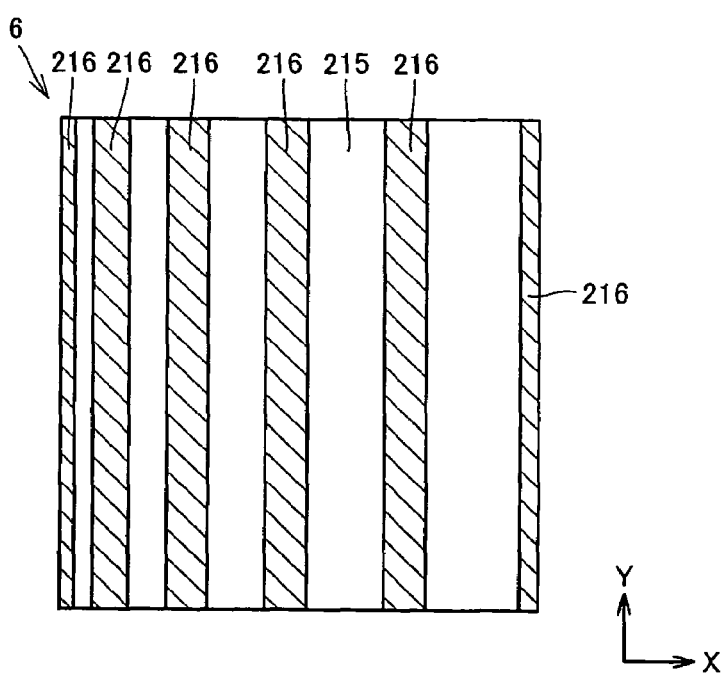
FIGS. 44 and 45 are diagrams illustrating steps of manufacturing OBO planar waveguide device 6 according to Embodiment 6 of the present invention.
Figure 45:
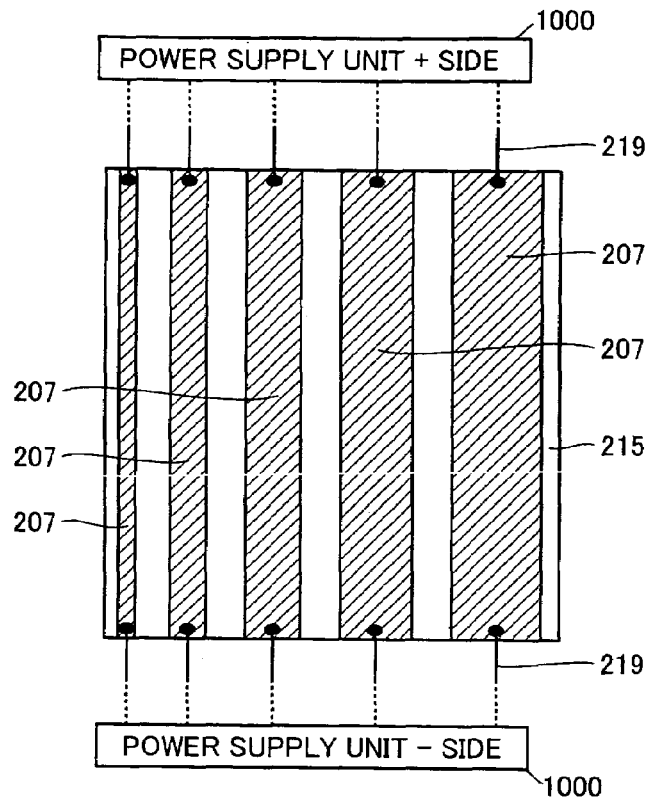

A method of manufacturing OBO planar waveguide device 6 having a plurality of heat generating portions 207 different in the area from each other will now be described with reference to FIGS. 44 and 45.

A resist pattern 216 used in the method of manufacturing OBO planar waveguide device 6 in the present embodiment is different in shape and arrangement from resist pattern 156 used in the method of manufacturing OBO planar waveguide device 3 in Embodiment 3. Meanwhile, Si substrate 202, SiO$_2$ layer 203, Si optical waveguide 204, resist pattern 216, the material for heat generating portion 207, and the method of forming each member in the present embodiment are exactly the same as Si substrate 142, SiO$_2$ layer 143, Si optical waveguide 144, resist pattern 153, the material for heat generating portion 157, and the method of forming each member in Embodiment 3, respectively.

Power supply unit 1000 is connected to the plurality of heat generating portions 207, in order to change the temperature of the plurality of heat generating portions 207. One ends of a plurality of metal lines 219 are connected to the positive terminal and the negative terminal of power supply unit 1000. The other ends of the plurality of metal lines 219 are attached to side end portions in the X-axis direction of the plurality of heaters 207. Namely, one end portions of the plurality of heat generating portions 216 are connected to the − terminal of power supply unit 1000 through metal lines 219, while the other end portions thereof are connected to the + terminal of power supply unit 1000 through metal lines 219. In other words, each of the plurality of heat generating portions 216 is electrically connected to power supply unit 1000 through metal line 219 and the same voltage is applied to each of the plurality of heat generating portions 216.

An operation of aforementioned OBO planar waveguide device 6 will now be described with reference to FIGS. 41 to 43.

In the present embodiment, the plurality of heat generating portions 207 different in the two-dimensionally viewed area are used to regulate the temperature difference per unit length in the X-axis direction of substrate 202. The difference in the refractive index per unit length in the X-axis direction of Si optical waveguide 204 is thus controlled. Therefore, magnitude of the amplitude of OBO of the demultiplexed signal wave can be regulated using heat generation by the plurality of heat generating portions 207, to freely designate output port 206 for the signal wave.

How the plurality of heat generating portions 207 different in the two-dimensionally viewed area from each other control the temperature difference per unit length in the X-axis direction of substrate 201 will now be described in detail with reference to FIGS. 41 to 43.

The plurality of heat generating portions 207 are the same in the thickness. Accordingly, if the area of heat generating portion 207 increases, the resistance value of heat generating portion 207 decreases. In addition, the area of heat generating portion 207 when OBO planar waveguide device 6 is viewed in the Z-axis direction gradually increases or decreases in accordance with the order of arrangement of heat generating portions 207 in the X-axis direction. Moreover, an amount of heat generated by heat generating portion 207 is varied in proportion to the resistance value. Accordingly, when the same voltage is applied to all the plurality of heat generating portions 207, the gradient of temperature distribution gradually increasing or decreasing in the X-axis direction of substrate 201 is generated. More specifically, in the present embodiment, with regard to relation between combinations of two adjacent heat generating portions 207 among the plurality of heat generating portions 207, a ratio of difference in the two-dimensionally viewed area of two heat generating portions 207 to the pitch between two heat generating portions 207 corresponds to the gradient of temperature distribution of Si substrate 202.

According to the planar waveguide device of the present embodiment above, if solely a single voltage value of power supply unit 1000 is regulated, the temperature difference per unit length in the X-axis direction of substrate 201 can be controlled. Therefore, improved controllability of OBO planar waveguide device 6 is achieved.

Embodiment 7

Figure 46:
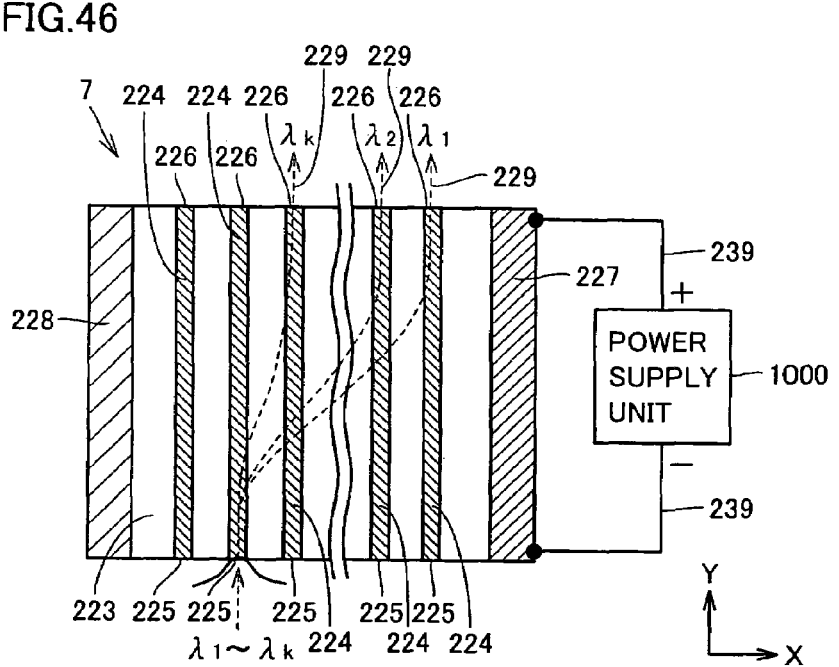
FIG. 46 is a top view of an OBO planar waveguide device 7 according to Embodiment 7 of the present invention.
Figure 47:
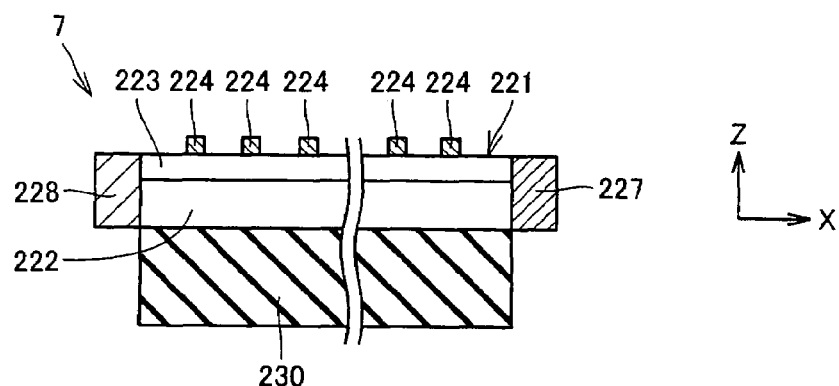
FIG. 47 is a side view of OBO planar waveguide device 7 according to Embodiment 7 of the present invention.
Figure 48:
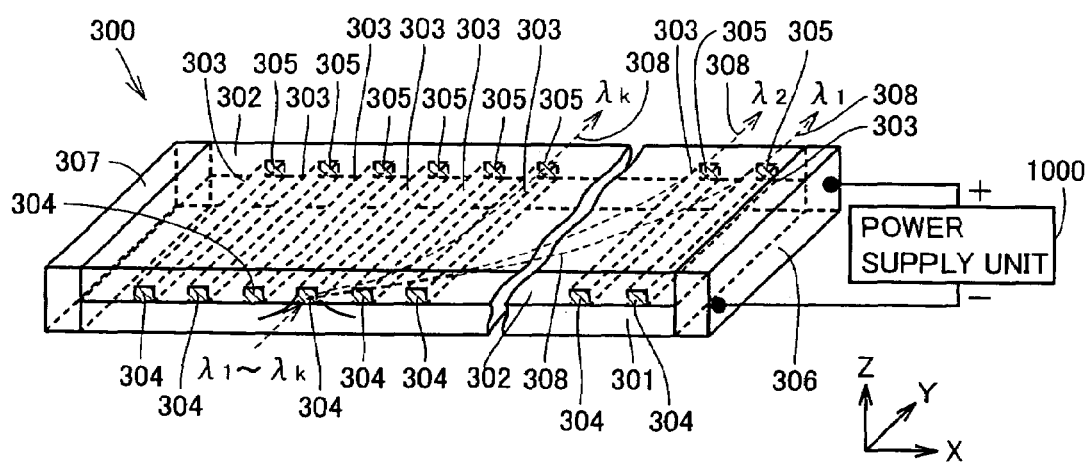
FIG. 48 illustrates a configuration of a conventional OBO planar waveguide device 300.

An OBO planar waveguide device 7 according to Embodiment 7 of the present invention will be described with reference to FIGS. 46 and 47. OBO planar waveguide device 7 according to the present embodiment is different from OBO planar waveguide device 1 according to Embodiment 1 in that an $SiO_2$ reinforcing substrate 230 having a thickness of 500 μm is provided on a back surface of an Si substrate 222 of OBO planar waveguide device 7. OBO planar waveguide device 7 in the present embodiment, however, is exactly the same as OBO planar waveguide device 1 in Embodiment 1 in the structure and function of portions other than the portion described above. As shown in FIGS. 46 and 47, a direction in which a plurality of Si optical waveguides 224 are aligned is assumed as the X-axis direction, a direction in which each Si optical waveguide 224 extends is assumed as the Y-axis direction, and a direction perpendicular to the X-axis direction and the Y-axis direction is assumed as the Z-axis direction.

Initially, a configuration of aforementioned OBO planar waveguide device 7 will be described with reference to FIGS. 46 and 47.

In OBO planar waveguide device 7, $SiO_2$ reinforcing substrate 230 having a thickness of 500 μm is attached so as to cover the entire back surface of Si substrate 222 having a thickness of 100 μm. A heater 227 and a heat sink 228 are not attached to opposing end portions of $SiO_2$ reinforcing substrate 230 having a thickness of 500 μm. As heater 227 is not provided on $SiO_2$ reinforcing substrate 230 as above, gradient of temperature distribution resulting from heat generated by heater 227 is efficiently formed.

A method of manufacturing OBO planar waveguide device 7 provided with aforementioned $SiO_2$ reinforcing substrate 230 will now be described.

The method of manufacturing OBO planar waveguide device 7 according to the present embodiment is different from the method of manufacturing OBO planar waveguide device 1 according to Embodiment 1 in that the step of providing $SiO_2$ reinforcing substrate 230 is added as the last step of the steps for manufacturing OBO planar waveguide device 1. In the step of providing $SiO_2$ reinforcing substrate 230, a fusion method or the like is used to attach $SiO_2$ substrate 230 having a thickness of 500 μm to the back surface of Si substrate 222. Meanwhile, Si substrate 222, an $SiO_2$ layer 223, Si optical waveguide 224, heater 227, heat sink 228, and the method of forming each member in the present embodiment are exactly the same as Si substrate 102, $SiO_2$ layer 103, Si optical waveguide 104, heater 117, heat sink 118, and the method of forming each member in Embodiment 1, respectively.

In the present embodiment, after the back surface of Si substrate 222 is polished, $SiO_2$ reinforcing substrate 230 is attached to the back surface of Si substrate 222. Accordingly, mechanical strength of OBO planar waveguide device 7 is enhanced. Therefore, even if the back surface of Si substrate 222 is polished in order to lower power consumption and improve response of OBO planar waveguide device 7, the mechanical strength of OBO planar waveguide device 7 is recovered. In addition, thermal conductivity of $SiO_2$ is approximately one hundredth or lower than that of Si, that is, relatively quite small. Therefore, if $SiO_2$ reinforcing substrate 230 is provided on the back surface of Si substrate 222, heat dissipation from Si substrate 222 to the outside is prevented. An amount of power consumption of heater 227 for heating the OBO planar waveguide device can thus be lowered. Moreover, as the heat does not escape from Si substrate 222, each portion in Si substrate 222 can attain to a desired temperature more rapidly. Response of the OBO planar waveguide device is thus improved.

In addition, in the present embodiment, $SiO_2$ is used as a material for the reinforcing substrate, however, the material for the reinforcing substrate is not limited to $SiO_2$, so long as a material having thermal conductivity lower than Si is employed. In addition, the thickness of the reinforcing substrate is not limited to 500 μm, so long as the strength of OBO planar waveguide device 7 is sufficiently ensured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A planar waveguide device comprising:
   an Si substrate;
   an insulating layer provided on said Si substrate;
   a plurality of Si optical waveguides aligned substantially in parallel to each other on one main surface of said insulating layer; and
   a heater for controlling gradient of temperature distribution of said Si substrate in a direction in which said plurality of Si optical waveguides are aligned; wherein
   said heater is provided on one side end surface of said Si substrate in the direction in which said plurality of Si optical waveguides are aligned,
   heat generated by said heater conducts from said one side end surface of said Si substrate toward another side end surface opposed to said one side end surface, and
   said Si substrate has thermal resistance greater than 20 K/W and lower than 2000 K/W, between said one side end surface and said another side end surface.

2. The planar waveguide device according to claim 1, wherein
   a product of a thickness of said Si substrate and a length of said Si substrate in a direction in which said plurality of Si optical waveguides extend is greater than 500 µm² and smaller than 50000 µm².

3. The planar waveguide device according to claim 1, wherein
said Si substrate has an impurity concentration higher than $1 \times 10^{20}$ cm$^{-3}$ and lower than $1 \times 10^{22}$ cm$^{-3}$, and
a product of a thickness of said Si substrate and a length of said Si substrate in a direction in which said plurality of Si optical waveguides extend is greater than 500 µm² and smaller than 100000 µm².

4. The planar waveguide device according to claim 1, wherein
said plurality of Si optical waveguides are composed of Si without being doped with an impurity.

5. A planar waveguide device comprising:
a substrate;
a plurality of optical waveguides aligned substantially in parallel to each other on one main surface of said substrate; and
a heater for controlling gradient of temperature distribution of said substrate in a direction in which said plurality of optical waveguides are aligned; wherein
said heater has a plurality of heat generating portions provided on another main surface of said substrate.

6. The planar waveguide device according to claim 5, wherein
said plurality of heat generating portions extend substantially in parallel to each other from one end to another end on said another main surface of said substrate, such that a direction in which said plurality of heat generating portions are aligned is substantially identical to the direction in which said plurality of optical waveguides are aligned, and
with regard to relation between combinations of two adjacent heat generating portions among said plurality of heat generating portions, number density per unit length of said two heat generating portions corresponds to said gradient of the temperature distribution.

7. The planar waveguide device according to claim 5, wherein
said plurality of heat generating portions extend substantially in parallel to each other from one end to another end on said another main surface of said substrate, such that a direction in which said plurality of heat generating portions are aligned is substantially identical to the direction in which said plurality of optical waveguides are aligned, and
with regard to relation between combinations of two adjacent heat generating portions among said plurality of heat generating portions, a ratio of difference in a voltage applied to said two heat generating portions to a pitch between said two heat generating portions corresponds to said gradient of the temperature distribution.

8. The planar waveguide device according to claim 5, wherein
said plurality of heat generating portions extend along a direction substantially perpendicular to a direction in which said plurality of heat generating portions are aligned, and
degree of variation of total of two-dimensionally viewed widths of said plurality of heat generating portions corresponds to said gradient of the temperature distribution.

9. The planar waveguide device according to claim 5, wherein
said plurality of heat generating portions extend substantially in parallel to each other from one end to another end on said another main surface of said substrate, such that a direction in which said plurality of heat generating portions are aligned is substantially identical to the direction in which said plurality of optical waveguides are aligned, and
with regard to relation between combinations of two adjacent heat generating portions among said plurality of heat generating portions, a ratio of difference in a two-dimensionally viewed area of said two heat generating portions to a pitch between said two heat generating portions corresponds to said gradient of the temperature distribution.

10. A planar waveguide device comprising:
a substrate;
a plurality of optical waveguides aligned substantially in parallel to each other on one of main surfaces of said substrate;
a heater for controlling gradient of temperature distribution of said substrate in a direction in which said plurality of optical waveguides are aligned; and
a reinforcing substrate provided on another main surface of said substrate; wherein
said heater is provided on one side end surface of said substrate in the direction in which said plurality of optical waveguides are aligned,
heat generated by said heater conducts from said one side end surface of said substrate toward another side end surface opposed to said one side end surface, and
said reinforcing substrate has thermal conductivity lower than that of said substrate.

* * * * *